US012651903B2

(12) United States Patent　　　　　(10) Patent No.:　US 12,651,903 B2
Miller et al.　　　　　　　　　　　　　(45) Date of Patent:　　　　Jun. 9, 2026

(54) GRID POWER RESPONSE WITH OPTIMALLY SIZED STORAGE

(71) Applicant: Atlas Power Technologies Inc., Abbotsford (CA)

(72) Inventors: Mitchell Miller, Mission (CA); Hua Zhou, Oakville (CA); Jiacheng Wang, Coquitlam (CA)

(73) Assignee: Atlas Power Technology Inc., Abbotsford (CA)

( * ) Notice: Subject to any disclaimer, the term of this patent is extended or adjusted under 35 U.S.C. 154(b) by 0 days.

(21) Appl. No.: 19/128,164

(22) PCT Filed: Dec. 12, 2023

(86) PCT No.: PCT/CA2023/051647

§ 371 (c)(1),
(2) Date: May 7, 2025

(87) PCT Pub. No.: WO2024/130385

PCT Pub. Date: Jun. 27, 2024

(65) Prior Publication Data

US 2026/0121412 A1　　Apr. 30, 2026

Related U.S. Application Data

(60) Provisional application No. 63/433,759, filed on Dec. 20, 2022.

(51) Int. Cl.
H02J 3/11　　　　(2026.01)
H02J 3/0014　　　(2026.01)
(Continued)

(52) U.S. Cl.
CPC ............. H02J 3/11 (2026.01); H02J 3/00142 (2026.01); H02J 3/32 (2013.01); H02J 7/82 (2026.01)

(58) Field of Classification Search
CPC .. H02J 3/11; H02J 7/82; H02J 3/00142; H02J 3/32
(Continued)

(56) References Cited

U.S. PATENT DOCUMENTS

2008/0143304 A1　　6/2008　Bose
2010/0114397 A1　　5/2010　Cardinal
(Continued)

FOREIGN PATENT DOCUMENTS

CN　　　106786693 B　　5/2017
WO　　　2014/106095　　7/2014
WO　　　2016/109618　　7/2016

OTHER PUBLICATIONS

Pokhriyal, Impact of Battery Energy System Integration in Frequency Control of an Electrical Grid withWind Power, Clean Technologies, Oct. 9, 2022, Clean Technol. 2022, 4, 972-986.
(Continued)

*Primary Examiner* — Michael R. Fin
(74) *Attorney, Agent, or Firm* — Damien G. Loveland; Valuetech Patent Agency Inc.

(57)　　　　　　　ABSTRACT

An electrical response system allows both traditional and renewable power generating system primary frequency response (PFR), fast frequency response (FFR) and inertial response systems to coordinate their response operations with an energy storage system and optimally pre-size the energy storage system and its charge. The response system allows the energy storage system to be optimally pre-sized by coordinating a power generating system to respond (a) during an over-frequency event by reducing active power output, and (b) during an under-frequency event by the storage discharging active power, thereby providing a coordinated response. Under-frequency events cause power generating systems to pre-curtail their active power output to meet grid requirements, thereby the system and method
(Continued)

allows a power generating system to generate active power output at full nameplate capacity while simultaneously meeting electrical grid regulations and requirements.

19 Claims, 10 Drawing Sheets

(51) Int. Cl.
  *H02J 3/32*  (2026.01)
  *H02J 7/82*  (2026.01)

(58) Field of Classification Search
  USPC ........................................................ 307/43
  See application file for complete search history.

(56) References Cited

U.S. PATENT DOCUMENTS

2015/0338868 A1*  11/2015  Takaguchi ................ G05F 1/66
                                                   307/126
2019/0027960 A1*  1/2019  Agrawal ................... H02J 3/28
2019/0157876 A1*  5/2019  Dobrowolski ............ H02J 3/48

OTHER PUBLICATIONS

Bidairi, Optimal Sizing of Battery Energy Storage Systems for Dynamic Frequency Control in an Islanded Microgrid: A Case Study of Flinders Island, Australia, Energy, Mar. 2020 DOI: 10.1016/j.energy.2020.117059.

* cited by examiner

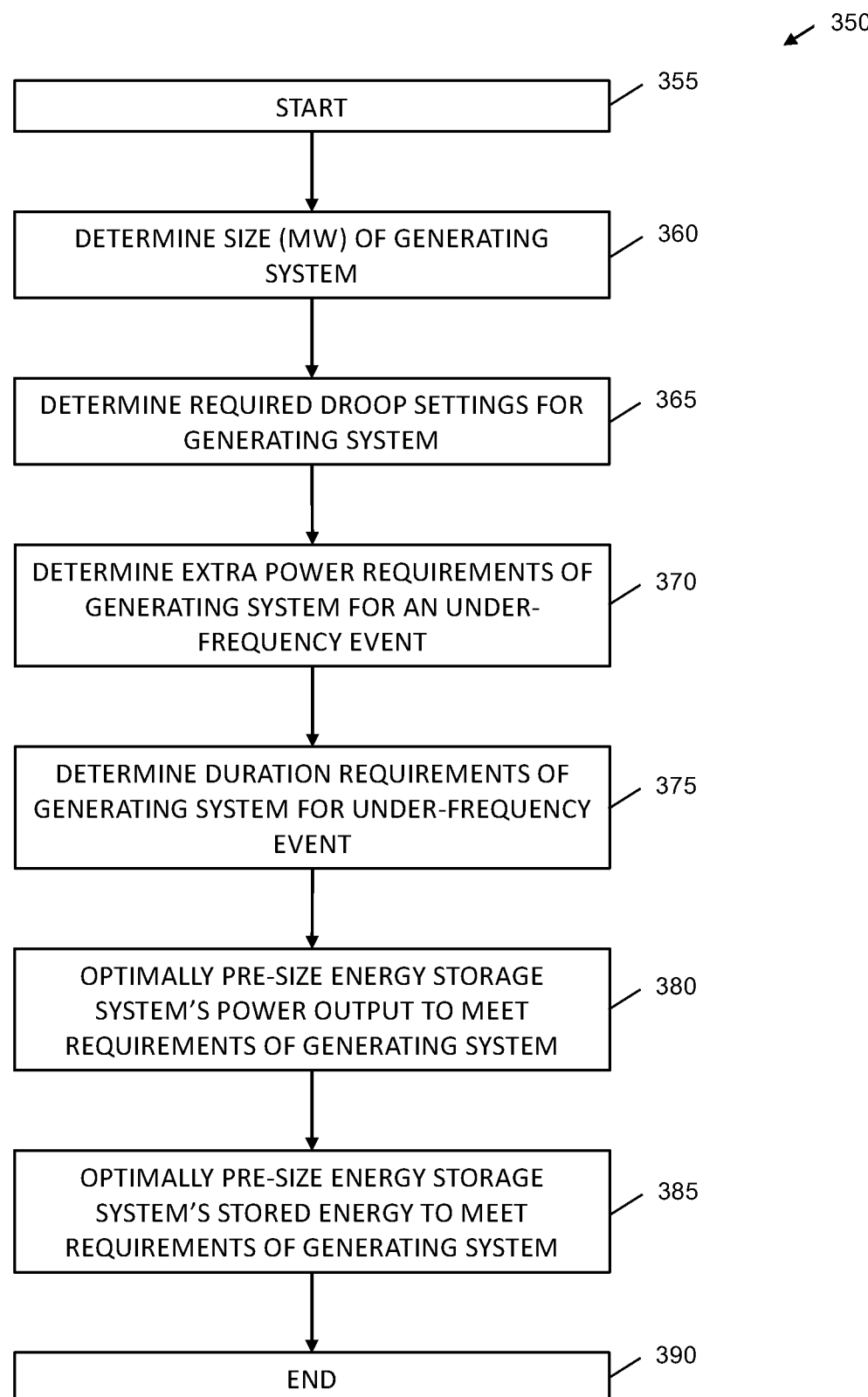

350

| START | 355 |

| DETERMINE SIZE (MW) OF GENERATING SYSTEM | 360 |

| DETERMINE REQUIRED DROOP SETTINGS FOR GENERATING SYSTEM | 365 |

| DETERMINE EXTRA POWER REQUIREMENTS OF GENERATING SYSTEM FOR AN UNDER-FREQUENCY EVENT | 370 |

| DETERMINE DURATION REQUIREMENTS OF GENERATING SYSTEM FOR UNDER-FREQUENCY EVENT | 375 |

| OPTIMALLY PRE-SIZE ENERGY STORAGE SYSTEM'S POWER OUTPUT TO MEET REQUIREMENTS OF GENERATING SYSTEM | 380 |

| OPTIMALLY PRE-SIZE ENERGY STORAGE SYSTEM'S STORED ENERGY TO MEET REQUIREMENTS OF GENERATING SYSTEM | 385 |

| END | 390 |

FIG. 5

GRID POWER RESPONSE WITH OPTIMALLY SIZED STORAGE

TECHNICAL FIELD

The disclosed system and method relate generally to the generation and distribution of electricity, and in particular, to a system and method for controlling, managing, and optimizing the responsiveness and sizing of power generation and energy storage of an electricity generating system, which is connected to an electric power network or electrical grid.

BACKGROUND

The sources for generating electricity have traditionally been from fossil fuels, though with the advent and subsequent scale and reduced cost to build and deploy renewable power generating systems, such as wind generation systems and photovoltaic solar systems, a larger percentage of renewable energy generation is now producing electricity for societies' electricity needs globally.

However, this larger percentage of electricity produced by wind and solar systems has introduced a great deal of intermittency into electrical grids. Traditional thermoelectric and hydroelectric generators were designed to contribute to grid reliability in the event of an unexpected system failure, such as a generator unexpectedly going offline or a transmission intertie tripping. This contribution to grid reliability was accomplished by means of a governor control strategy and component system and has been categorized as inertial response, primary frequency response (PFR) and firm/fast frequency response (FFR).

In the event of a grid failure, such as a generator failing to produce electricity, the frequency of the grid can begin to fall precipitously. This is due to the existing load being transferred to alternative electricity-producing generators, from the failing and now non-electricity-producing generator. As stated, this can cause the grid's inertia and frequency to decline, and the rotating frequency of the alternative, producing generators to slow down. This can have catastrophic effects on the grid, including brownouts and blackouts, which can also severely damage generation equipment. This is especially the case if the frequency declines to a level to cause additional generators to trip and go offline.

To compensate for grid failures, engineers designed generators to be equipped with governors, such as flyball governors, to automatically provide dynamic compensation to the electrical grid. These governors operate by means of droop settings and a droop control methodology based on the premise that the frequency of the grid should be maintained at a predetermined level. The frequency of the grid is managed to allow slight over and under-frequency variations that vary in a tightly defined region considered acceptable to grid operators and balancing authorities (BAs). This region is defined as the deadband, meaning the band or region where no frequency response is required, and where the slight variation in frequency is considered acceptable.

This droop control methodology for frequency response requires a predetermination of the deadband settings, and a droop percentage which is usually determined by the Most Severe System Contingency (MSSC). These settings are then programmed into the generator controls in order for the generator to respond during a frequency event. It should be noted that the MSSC can result in an under-frequency event or an over-frequency event. The process to detect, then respond, is an automatic process, as the response required is immediate and therefore needs to be predetermined and programmed into the controls prior to any negative system event occurring.

Additionally, in order for a generator to respond to an under-frequency event, which requires an injection of active (real) power, a certain amount of headroom is required. Headroom is a reserve capacity of active power and is a percentage of the generator's nameplate capacity. For an active power reserve to be available when needed, pre-curtailment or de-loading of the generator is required.

As governments have embraced the need to transition to a clean grid that utilizes renewables for electricity generation, more renewable power generating systems have been installed and a higher percentage of renewable electricity has been introduced to the electrical grid. Due to this, BAs have been challenged with a new issue of declining inertia and a declining quantity of frequency responsive reserves. This decline in inertia and frequency response is due to renewable power generating systems not having large spinning mechanical generators synchronously coupled to the grid. Simultaneously, this decline has also been due to grid operators not having required renewable power generating systems to provide an active power reserve by managing a pre-curtailment methodology that allows an operating headroom.

As a result of this identified decline in system inertia and frequency, BAs and grid regulators have begun taking steps and actions to ensure that all power generating systems are contributing to grid reliability. These steps and actions include a few common methods to ensure sufficient reserves of PFR and inertia, including mandating this capability as a requirement of interconnection. Alternatively, some BAs have designed market structures that package these requirements as ancillary services that are procured through a competitive bidding process.

With respect to the traditional governor-based frequency and inertia response methodology and control for fossil fuel (thermal) and hydro-generation generators, the operation of an active power reserve (headroom) results in significant costs for generator owners and operators. Based on common typical industry deadband settings of 0.017 Hz or 0.036 Hz, and a droop setting of between 4%-8%, this results in curtailment directly as a proportion of the rated nameplate capacity of the generator of between 5%-10%.

Additionally, alternative methods for providing PFR and inertial response have been investigated, including using energy storage and back-up generators. With respect to batteries and alternative energy storage, the cost of these electrical storage devices has declined over the last decade but still represents a meaningful cost.

Therefore, there is a need for a system and method for cost-effectively controlling and managing both traditional and renewable power generating systems' PFR, FFR and inertial response in a coordinated operation and that allows power generating systems to meet the grid regulations and requirements set by regulators and BAs while connected to an electrical grid.

The following refers to the article "IMPACT OF BATTERY ENERGY SYSTEM INTEGRATION IN FREQUENCY CONTROL OF AN ELECTRICAL GRID WITH WIND POWER" in Clean Technologies, Oct. 9, 2022, Clean Technol. 2022, 4, 972-986. The researchers describe a method for coordinated actions, control optimization and grid status among different actors on the grid. The researchers show how, depending on the control parameters and battery size, the frequency response may even become unstable due to interactions of the various pieces of technology. They also show that coordinated actions, control optimization and grid status among different actors on the grid (battery and wind) is required for stable operation. The focus is on optimal sizing of the battery assigned to perform both over-frequency and under-frequency regulation and studying the coordination of both functions with a wind power system. The investigators do not describe the use of an energy storage system in coordinating and allocating roles to provide specific actions between a renewable power generating system and the energy storage system, allowing optimal pre-sizing of the energy storage system for under-frequency events, and also do not describe this same coordination with pre-sizing, or use of, an energy storage system with a traditional non-renewable power generating system.

The following refers to the article "OPTIMAL SIZING OF BATTERY ENERGY STORAGE SYSTEMS FOR DYNAMIC FREQUENCY CONTROL IN AN ISLANDED MICROGRID: A CASE STUDY OF FLINDERS ISLAND, AUSTRALIA" in Energy, March 2020 DOI: 10.1016/j.energy.2020.117059. The researchers describe a method for sizing a battery energy storage system (BESS) within a microgrid. This study aims to provide an approach for sizing a BESS which is probabilistic and is proposed from the perspective of the transient responses to various disturbances of the entire system. With the purpose of mitigating both the impact of large-scale renewable energy penetration on frequency nadir (lowest post-disturbance frequency), as well as the MSCC of steady-state deviation in the system generation and load outages, this study demonstrates optimum BESS sizing. The investigators do not describe the use of an energy storage system in coordinating and allocating roles to provide specific actions between a renewable power generating system and the energy storage system allowing optimal pre-sizing of the energy storage system, and also do not describe this same coordination with pre-sizing, or use of, an energy storage system with a traditional non-renewable power generating system.

The following refers to "UTILITY SCALE RENEWABLE ENERGY SYSTEM CONTROLS FOR RAMP-RATE, VOLTAGE, AND FREQUENCY MANAGEMENT", referencing patent document WO2016/109618A1, International Publication Date 7 Jul. 2016, EATON CORPORATION. The inventors of the described invention describe a renewable energy system that utilizes energy storage and a back-up generator to provide ramp-rate, voltage, and frequency management. The inventors do not describe the use of an energy storage system in coordinating and allocating roles to provide specific actions between a renewable power generating system and the energy storage system allowing optimal pre-sizing of the energy storage system, and also do not describe this same coordination with pre-sizing, or use of, an energy storage system with a traditional non-renewable power generating system.

The following refers to "RESPONDING TO LOCAL GRID EVENTS AND DISTRIBUTED GRID EVENTS", referencing patent document WO2014/106095A1, International Publication Date 3 Jul. 2014, XTREME POWER INC. The inventors of the described invention describe a control system for an energy storage device coupled to sensors on an electrical grid. The control system determines, based on the received measurements from sensors, a response mode for controlling the energy storage device based on whether the grid event is determined to be a local event or a distributed event. The inventors do not describe the use of energy storage system in coordinating and allocating roles to provide specific actions between a renewable power generating system and the energy storage system allowing optimal pre-sizing of the energy storage system, and also do not describe this same coordination with pre-sizing, or use of, an energy storage system with a traditional non-renewable power generating system.

The following refers to "INTEGRATED REAL-TIME POWER AND SOLAR FARM CONTROL SYSTEM; referencing document US2010/0114397A1, Pub. Date: May 6, 2010, GENERAL ELECTRIC COMPANY. The inventors of the described invention describe a renewable energy system that controls and coordinates renewable energy sources to provide a controllable electrical output. They describe various functions and components of the system including a solar farm and reference energy storage. The inventors do not describe the use of an energy storage system in coordinating and allocating roles to provide specific actions between a renewable power generating system and the energy storage system allowing optimal pre-sizing of the energy storage system, and also do not describe this same coordination with pre-sizing, or use of, an energy storage system with a traditional non-renewable power generating system.

The following refers to "SYSTEM AND METHOD FOR CONTROLLING MICROGRID", referencing the patent document US2008/0143304A1, Jun. 19, 2008, GENERAL ELECTRIC COMPANY. The inventors of the described invention describe a method for controlling a microgrid. They describe various functions and components of the system including the implementation of the tie line control that allows a microgrid to behave as a dispatchable entity to the bulk grid. The inventors do not describe the use of an energy storage system in coordinating and allocating roles to provide specific actions between a renewable power generating system and the energy storage system allowing optimal pre-sizing of the energy storage system, and also do not describe this same coordination with pre-sizing, or use of, an energy storage system with a traditional non-renewable power generating system.

SUMMARY

Disclosed is an electrical response system and method for coordinating traditional and renewable power generation with an optimally pre-sized energy storage system.

An electrical response system and method is designed to allow both traditional and renewable power generating systems' PFR, FFR and inertial response systems to coordinate their response operations with an energy storage system, providing a system and method to optimally pre-size the energy storage system. The electrical response system provides a system and method to allow the energy storage system to be optimally pre-sized, by coordinating a power generating system to respond during an over-frequency event by reducing its active power output, and the energy storage system to respond during an under-frequency event by discharging its active power. This thereby provides a coordinated response that allows the energy storage system to be pre-sized optimally to respond to and focus on under-frequency events that cause a power generating system to pre-curtail its active power output to meet grid requirements. The system and method thereby provide a power generating system that is operating normally and providing electricity to a load connected to an electrical grid to output its active power at full nameplate capacity, while ensuring the power generating system complies with grid regulations and operational requirements.

In one embodiment, an electrical response system and method is designed to allow both traditional and renewable power generating systems' PFR, FFR and inertial response systems to coordinate their response operations with an energy storage system, providing a system and method to optimally pre-size the energy storage system herein provided.

The electrical response system includes an energy storage system with a quantity of stored energy that is optimally sized for power (MW or kW) and for energy/duration (MWh or kWh). In an exemplary embodiment, the sizing for energy and power may be determined by the required response of a power generating system during an under-frequency event, and/or the maximum power and energy that would be required by a power generating system, and/or the required response that could be determined based on the local BA's requirement, or determined by, state, province, federal or country level regulations or requirements. In certain embodiments, the sizing may also be determined by the required response of a power generating system during an under-frequency event, with additional added stored energy such as between 0.1%-100% of additional stored energy, and/or the required response may be determined based on the local BA's requirement, or determined by state, province, federal or country level regulations or requirements. The sizing references government regulations that may require both a "minimum" power and energy for frequency responses to meet regulations, and an "additional" stored energy as well. In other words, there may be one part based on local requirement, and another part based on energy additional to this. In certain embodiments the sizing of the energy storage system may be determined by the capability of a power generating system to respond to both under-frequency and over-frequency events and/or the required response may be determined based on the local BA's requirement, or determined by state, province, federal or country level regulations or requirements.

In an exemplary embodiment, the system and method include a power generating system that is coordinated to provide a response if a grid event causes the frequency to rise above the deadband setting by reducing its active power output. The system and method also include an energy storage system with stored energy that is coordinated to respond during an under-frequency event by discharging stored energy to provide active power to the grid, thereby providing a coordinated response.

In an exemplary embodiment, the system and method allow the energy storage system to be pre-sized optimally to respond, by sizing power and energy for under-frequency events, which, during normal operation and generally due to grid regulations, cause a generator to pre-curtail its active power output to meet these grid requirements.

The system and method thereby provide a power generating system that is operating normally and providing electricity to a load, connected to an electrical grid, to output its active power at full nameplate capacity while ensuring the power generating system complies with grid regulations and operational requirements.

In accordance with another aspect of the invention, there is provided an electrical response system coupled to a point of interconnection of an electrical system. The electrical response system includes: (a) an energy source coupled to a distribution line; (b) an energy storage source including an energy storage device coupled to an energy storage power converter and/or an inverter, wherein the energy storage converter and/or inverter is coupled to the distribution line between, or at the point of, interconnection and the energy source; and (c) a control system operatively coupled to the energy storage source and the energy source(s), wherein the control system is structured to: (i) provide under-frequency response control by controlling active power output from an energy storage device by the energy storage inverter, and (ii) provide over-frequency response control by controlling the active power output from an energy source.

In accordance with another aspect of the invention, there is provided a system for providing alternating-current (AC) electrical energy to an electrical grid, the system having an electrical generator connected to the electrical grid. The system includes: (a) an energy storage device for storing electrical energy, the energy storage device being operable to receive electrical energy from at least one of the electrical generator and the electrical grid, the energy storage device being operable to provide electrical energy to the electrical grid; and (b) a controller operable to reduce electrical output from the electrical generator in response to an over-frequency event, and operable to cause the energy storage device to provide electrical energy to the electrical grid in response to an under-frequency event.

The energy storage device may have a storage capacity selected in response to a reserve capacity of the electrical generator. The energy storage device may have a power output rating selected in response to a reserve capacity of the electrical generator. The controller may be operable to adjust the state of charge (SOC) of the energy storage device in response to an output level of the electrical generator. The controller may be operable to adjust the SOC such that a first ratio, of the SOC to a maximum SOC (100%) of the energy storage device, matches a second ratio, of the output level to a maximum output level of the electrical generator.

The energy storage device may be operable to store electrical energy provided by direct-current (DC). The system may further include a power adapter for producing AC electrical energy in response to the DC electrical energy provided by the energy storage device. The energy storage device may be operable to provide electrical energy to the electrical grid via the power adapter. The controller may be operable to control the electrical generator and the energy storage device such that a frequency of the AC electrical energy is urged to remain within a predetermined acceptable frequency range. The controller may be operable to reduce the electrical output from the electrical generator in response to the frequency exceeding the predetermined acceptable frequency range. The controller may be operable to cause the energy storage device to provide a controlled amount of electrical energy to the electrical grid instead of the electrical generator in response to the frequency falling below the predetermined acceptable frequency range.

The system may further include a plurality of the electrical generators. The controller may be operable to reduce the electrical output from one or more of the electrical generators in response to the over-frequency event. The system may further include a plurality of the energy storage devices. The controller may be operable to cause one or more of the energy storage devices to provide the electrical energy to the electrical grid in response to the under-frequency event. The energy storage device may be a supercapacitor. The energy storage device may be a battery.

In accordance with another aspect of the invention, there is provided a computer-implemented method of controlling AC electrical energy on an electrical grid to which an electrical generator is connected. The method involves: (a) storing electrical energy that is received by an energy storage device from at least one of the electrical generator and the electrical grid; (b) detecting by a computer-implemented controller at least one of an over-frequency event and an under-frequency event; (c) in response to the over-frequency event, controlling the electrical generator by the controller to reduce electrical output from the electrical generator; and (d) in response to the under-frequency event, controlling the energy storage device by the controller to provide electrical energy from the energy storage device to the electrical grid.

Step (a) may involve storing the electrical energy by the energy storage device having a storage capacity selected in response to a reserve capacity of the electrical generator. Step (a) may involve storing the electrical energy by the energy storage device having a power output rating selected in response to a reserve capacity of the electrical generator. The method may further involve: (e) adjusting by the controller an SOC of the energy storage device in response to an output level of the electrical generator. Step (e) may involve adjusting the SOC such that a first ratio, of the SOC to a maximum SOC of the energy storage device, matches a second ratio, of the output level to a maximum output level of the electrical generator.

Step (a) may involve storing, by the energy storage device, DC-provided electrical energy. Step (d) may involve producing AC electrical energy in response to the DC electrical energy by a power adapter. Step (d) may involve providing, by the power adapter, the AC electrical energy to the electrical grid. Step (c) may involve controlling the electrical generator such that a frequency of the AC electrical energy is urged to remain within a predetermined acceptable frequency range. Step (d) may involve controlling the electrical storage device such that the frequency is urged to remain within the predetermined acceptable frequency range. Step (c) may involve controlling the electrical generator to reduce the electrical output in response to the frequency exceeding the predetermined acceptable frequency range. Step (d) may involve controlling the energy storage device to provide a controlled amount of electrical energy to the electrical grid instead of the electrical generator in response to the frequency falling below the predetermined acceptable frequency range. Step (c) may involve controlling a plurality of the electrical generators to reduce the electrical output from one or more of the electrical generators. Step (d) may involve controlling a plurality of the energy storage devices to provide the electrical energy from one or more of the energy storage devices. Step (a) may involve storing the electrical energy when the energy storage device is a supercapacitor. Step (a) may involve storing the electrical energy when the energy storage device is a battery.

Disclosed is a system for providing electrical energy to an electrical grid, the system having an electrical generator connected to the electrical grid, the system comprising (a) an energy storage device for storing the electrical energy, the energy storage device being operable to receive the electrical energy from at least one of the electrical generator and the electrical grid, the energy storage device being operable to provide the electrical energy to the electrical grid; and (b) a controller operable to reduce an output level of the electrical generator in response to an over-frequency event, and operable to cause the energy storage device to provide the electrical energy to the electrical grid in response to an under-frequency event.

Also disclosed is a computer-implemented method of controlling electrical energy supplied to an electrical grid to which an electrical generator is connected, the method comprising: (a) storing, in an energy storage device, the electrical energy, which is received from at least one of the electrical generator and the electrical grid; (b) detecting, by a controller, an over-frequency event; (c) in response to the over-frequency event, controlling the electrical generator by the controller to reduce an output level of the electrical generator; (d) detecting, by the controller, an under-frequency event; and (e) in response to the under-frequency event, controlling the energy storage device by the controller to provide the electrical energy from the energy storage device to the electrical grid.

This summary provides a simplified, non-exhaustive introduction to some aspects of the invention, without delineating the scope of the invention.

BRIEF DESCRIPTION OF THE DRAWINGS

FIG. 5 is an example method for optimally pre-sizing the energy storage system and stored energy to meet the requirements of a power generating system by coordinating the over-frequency and under-frequency response of the power generating system in relation to a grid frequency event.

DETAILED DESCRIPTION

A. Glossary

AC: Alternating current

BA: Balancing authority

BESS: Battery energy storage system

DC: Direct current

Figure 1:
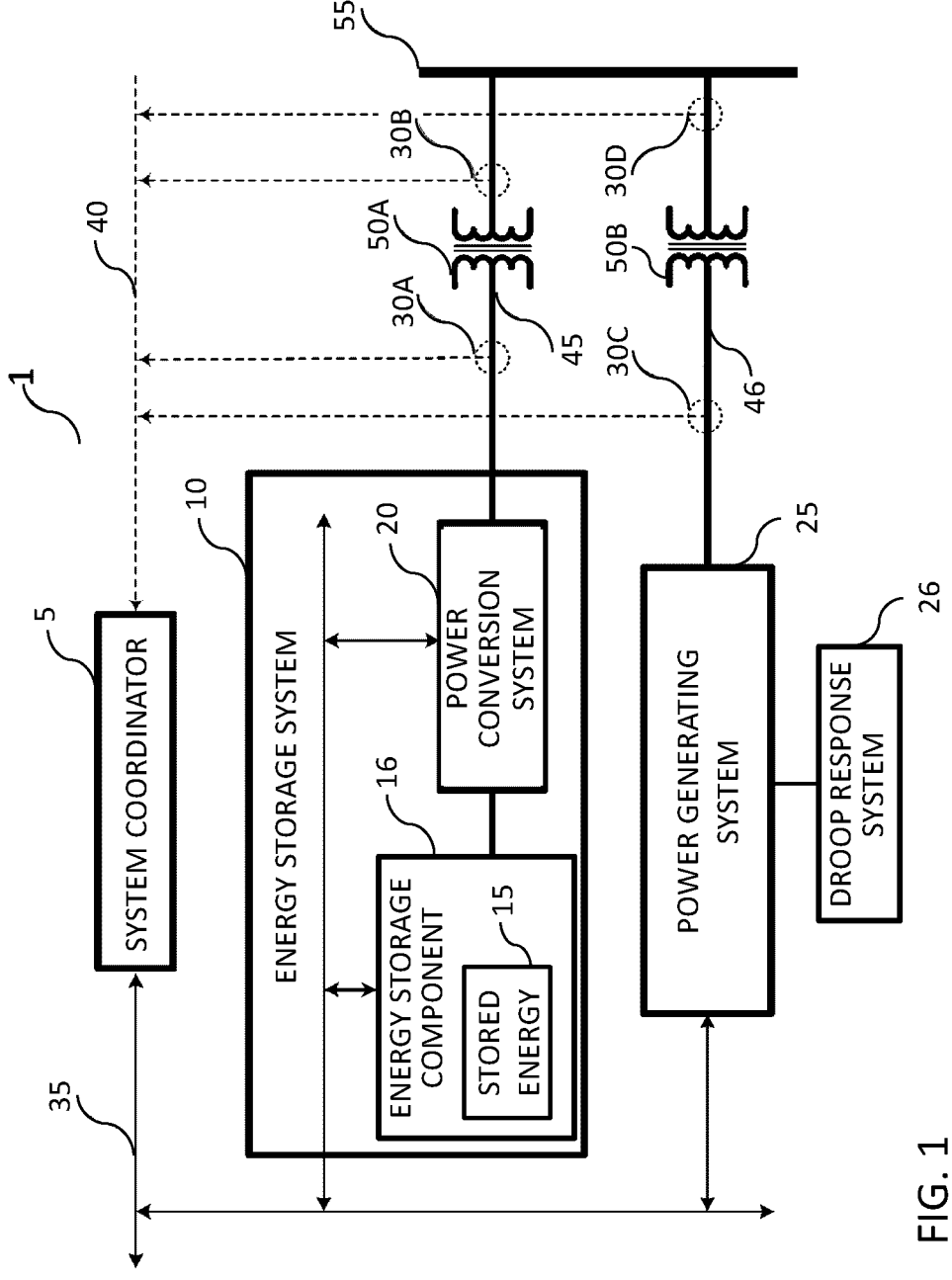
FIG. 1 is a functional block diagram depicting an exemplified embodiment of the coordinated electrical response system.

Deadband: an acceptable range of frequency variation of a generator that is connected to an electrical grid.

Droop, or Droop Control: This represents the percentage change in the output power of a generating system in response to a change in frequency.

Droop Setting: the additional power per unit frequency change that needs to be added to a generator's output in order to bring its frequency back into the deadband.

ERCOT: Electricity Reliability Council of Texas

Firmware: The term "firmware" includes, but is not limited to, program code that performs some or all of the computations necessary for controlling the response to a frequency event.

FFR: Firm frequency response or fast frequency response

Headroom, or Pre-curtailment: a reserve capacity of active power, typically expressed as a percentage of a generator's nameplate capacity.

Module: The term "module" refers to any component in this invention and to any or all of the features of the invention without limitation. A module may be a software, firmware or hardware module.

MSSC: Most severe system contingency

Over-Frequency Event: an increase in frequency of a generator above the deadband due, for example, to too little power being drawn from the generator.

PFR: Primary frequency response

Processor: The term "processor" or "processing circuitry" is used to refer to any electronic circuit or group of circuits that perform calculations, and may include, for example, single or multicore processors, multiple processors, an ASIC (Application Specific Integrated Circuit), and dedicated circuits implemented, for example, on a reconfigurable device such as an FPGA (Field Programmable Gate Array). The processor performs the steps in the flowcharts, whether they are explicitly described as being executed by the processor or whether the execution thereby is implicit due to the steps being described as performed by code or a module. The processor, if comprised of multiple processors, may be located together or geographically separate from each other. The term includes virtual processors and machine instances as in cloud computing or local virtualization, which are ultimately grounded in physical processors.

Real-Time: The term "real-time" means that as one action is occurring, another action is occurring in response to it and at the same time, subject to inherent time lags due to electronic, electric, mechanical and thermal limitations, for example. The actions may appear to a human to be simultaneous, or to be close enough together that their occurrences are, for substantially all intents and purposes, as good as simultaneous.

SOC: State of charge of a battery, typically expressed as a percentage of the maximum possible charge Software: The term "software" includes, but is not limited to, program code that performs some or all of the computations necessary for controlling the response to a frequency event.

SOH: State of health of a battery, typically a percentage that refers to the maximum amount of charge a rechargeable battery can presently hold compared to its rated charge, or its maximum charge when new.

Under-Frequency Event: a drop in frequency of a generator below the deadband caused, for example, by an increased load due to another generator going off-line or an intertie tripping.

B. Exemplary Embodiments

FIG. 1 is a functional block diagram depicting an exemplified embodiment of the coordinated electrical response system 1. In an exemplary embodiment of the coordinated electrical response system 1, the system coordinator 5 determines the commands to the systems so the required responses to over-frequency events of the grid 55 are provided by an electrical generator such as the power generating system 25, and the required responses to under-frequency events of the grid 55 are provided by the energy storage system 10. The power generating system 25 may include any number of electrical power generators of any kind, including generators operable to provide electrical power generation by traditional and/or renewable methods.

In an exemplary embodiment of the coordinated electrical response system 1, the response commands to over-frequency events and under-frequency events are determined in advance of an event. In alternative embodiments, the system coordinator 5 determines system commands and responses to over-frequency events and under-frequency events at the time of the events (in real-time). In practice, due to the required short response rates for FFR, all responses may be set in advance, making real-time control redundant, unless the grid operator wants to intervene and increase or decrease the proportional response. The response commands, including parameters such as deadband, droop, power limit, etc., may be pre-determined prior to any real-time frequency events. The system then operates in a perpetual 'ready' mode, ensuring a state of "ready-to-respond" with a deterministic configuration and predictable deliverables. This approach guarantees fast and precise responses. With that being said, however, the grid operator or plant owner may retain the capability to override the overall output of the storage system for reasons they deem necessary.

In an exemplary embodiment the energy storage system 10 and stored energy 15 are pre-sized to meet both the power output requirement and a quantity of stored energy 15 that meets a power generating system's duration requirement for under-frequency events. The energy storage system 10 and stored energy may include any number of energy storage systems 10 and stored energy 15 of any kind, including systems operable to provide electrical energy storage 15 by traditional and/or renewable methods. In an exemplary embodiment, the power generating system 25 is designed to meet both power output requirement and duration requirement for normal power generation operations and over-frequency events.

In an exemplary embodiment the system coordinator 5 instructs the energy storage system 10 and stored energy 15 to discharge and provide active power to the grid 55 during an under-frequency event by means of a power adapter such as the power conversion system 20 shown in FIG. 1. The power adapter may be of any suitable type and may include a power inverter, such as a DC/AC inverter, a power converter, such as a DC/DC converter, or any combination thereof, for example. In an exemplary embodiment the system coordinator 5 and/or the power generating system's droop response system 26 instructs the power generating system 25 to reduce its active power output to the grid 55 during an over-frequency event. The droop response system may be separate to, or part of, the power generating system. In other cases, the power generating system is part of the droop response system. The droop response system may be, or may include, a droop controller, or a droop response control system. The droop response system may be hardware, firmware or software, or any combination of these.

In an exemplary embodiment the system coordinator 5 instructs the energy storage system 10 and stored energy 15 to discharge and provide active power to the grid 55 during an under-frequency event by means of one or more control lines 35 to the power conversion system 20 and as a response to information received from one or more optional sensors such as sensor 30A, sensor 30B, sensor 30C, sensor 30D. In an exemplary embodiment the information received from one or more of the optional sensors (sensor 30A, sensor 30B, sensor 30C, sensor 30D) is sent to the system coordinator 5 via one or more data lines 40. In an exemplary embodiment the system coordinator 5 instructs the power conversion system 20 to discharge stored energy 15 from the energy storage system 10 to the grid 55 through a transformer 50A and via one or more power lines 45. In alternative embodiments the transformer 50A is omitted from the system. In additional alternative embodiments the transformer 50A is a part of the power conversion system 20. In additional alternative embodiments the system may also comprise a plurality of transformers 50A.

In an exemplary embodiment the system coordinator 5 and/or the power generating system's droop response system 26 instructs the power generating system 25 to reduce its active power to the grid 55 during an over-frequency event by means of one or more control lines 35 and as a response to information received from the power generating system's droop response system 26 and/or one or more optional sensors such as sensor 30A, sensor 30B, sensor 30C, sensor 30D. In an exemplary embodiment the information received from one or more of the optional sensors (sensor 30A, sensor 30B, sensor 30C, sensor 30D) is sent to the system coordinator 5 via one or more data lines 40. In an exemplary embodiment the power generating system's droop response system 26, coordinating with the system coordinator 5, instructs the power generating system 25 to reduce its active power output to the grid 55 through a transformer 50B and via one or more power lines 46. In alternative embodiments the transformer 50B is omitted from the system. In additional alternative embodiments the transformer 50B is a part of the power generation system 25. In additional alternative embodiments the system may also comprise a plurality of transformers 50B.

In exemplified embodiments a renewable power generating system 25 with renewable generator(s) such as a wind turbine generator or wind farm or photovoltaic solar cell farm is designed to coordinate its response with an energy storage system. In additional exemplified embodiments a power generating system 25 with a thermal generator, non-limiting examples of which are coal fired generators, natural gas fired generators and combined cycle generators, is designed to coordinate its response with an energy storage system 10. In additional exemplified embodiments a power generating system 25 with hydroelectric generator(s), fossil-fuel power stations, biomass-fuelled power plants, power generating systems using waste heat from industrial processes, solar thermal electric plants, steam turbine plants, gas turbine plants, combined cycle plants, internal combustion reciprocating engines, microturbines, stirling engines, marine energy or marine power, which is also sometimes referred to as ocean energy or ocean power, salinity gradient energy, biomass energy, gravitation water vortex power plants, fuel oil power plants, oil shale power plants, peat power plants, run-of-the-river power plants, tidal power plants, concentrated solar thermal hydroelectric power stations, solar power stations, wind power stations, coal power stations, natural gas power stations, nuclear power stations, thermal power stations, fuel driven power stations, ocean driven power stations, biomass power stations, geothermal power stations, base load power plants, peaking power plants, load-following power plants, and/or non-dispatchable power plants including such sources as wind and solar energy, is designed to coordinate their response with an energy storage system 10 as alternative embodiments.

In an exemplary embodiment, supercapacitors are used by the energy storage system 10 to store energy 15. In additional preferred embodiments batteries are used by the energy storage system 10 to store energy 15. In additional exemplified embodiments, a hybrid of batteries and supercapacitors are used by the energy storage system 10 to store energy 15. This system and method take advantage of the operation of this type component, therefore a broad range of possible alternatives may be used to accomplish this system and method's novelty and usefulness, referenced as possible embodiments of the disclosed invention. The following non-limiting examples of energy storage component 16 for storing energy 15 include accumulators, electrostatic accumulators and/or energy storage devices, batteries and/or electrochemical storage devices, including hybrids, magnetic field storage devices such as inductors, coils, fuel cells, or electrical storage devices. In certain embodiment the system and method may use a plurality and multitude of different storage devices 15 and may include cell balancing or balancing integrated circuits (ICs). Non-limiting examples of possible embodiments include: a single large capacity storage device such as a supercapacitor or ultracapacitor, battery, rechargeable battery, a multilayer or multi-cell configuration, a multi-storage device and/or pluralities, hybrid capacitors, double-layer electrolytic capacitors, pseudocapacitors, asymmetric capacitors, fossil fuel energy storage, mechanical energy storage, spring energy storage, compressed air energy storage (CAES), fireless locomotive energy storage, flywheel energy storage, solid mass gravitational energy storage, hydraulic accumulator energy storage, pumped-storage hydroelectricity (pumped hydroelectric storage (PHS), or pumped storage hydropower (PSH), energy storage thermal expansion energy storage, electrical energy storage, electromagnetic energy storage, superconducting magnetic energy storage (SMES), also superconducting storage coil, biological energy storage, glycogen energy storage, starch energy storage, electrochemical (BESS), flow battery energy storage, ultra battery energy storage, thermal energy storage, brick storage heater energy storage, cryogenic energy storage, liquid air energy storage (LAES), liquid nitrogen engine energy storage, eutectic energy storage system, ice storage air conditioning energy storage, molten salt energy storage, phase-energy storage material, seasonal thermal energy storage, solar pond energy storage, steam accumulator energy storage, thermal energy storage, chemical conversion energy storage, biofuel conversion energy storage, hydrated salts energy storage, hydrogen conversion energy storage, hydrogen peroxide conversion energy storage, power to gas and gas to power energy storage. These are a few non-limiting examples and may be substituted or used in conjunction with the disclosed invention.

In an exemplary embodiment, the electrical response system 1 includes a power generating system 25 coordinated with an energy storage system 10 and stored energy 15 that is optimally pre-sized to provide active power during an under-frequency event. In additional embodiments the electrical response system 1 includes a power generating system 25 coordinated with an energy storage system 10 and stored energy 15 that is optimally sized to provide multiple electrical responses including PFR, FFR and inertial response for grid 55. In additional embodiments, the electrical response system 1 includes a power generating system 25 coordinated with an energy storage system 10 and stored energy 15 that is optimally sized to provide multiple electrical responses including PFR, FFR and inertial response for grid 55, forming reactive power support services including the following non-limiting examples of voltage support and phase correction.

In an exemplified embodiment the disclosed system and method is used in a microgrid, forms a portion of the microgrid, or comprises the microgrid. In additional embodiments the sizing of the energy storage portion of the disclosed system and method may be sized based on one or more power generating systems 25. In certain embodiment the system and method may additionally be sized for a plurality of power generating systems 25. In certain embodi- (ERCOT) example report describing the equation used to calculate how the droop response requirements, set at 5%, effect the overall output power from the rated nameplate capacity of the generator 25. Based on a droop angle of 5%, this leads to 6.25% of the rated nameplate capacity of the unit being used for droop response.

| ERCOT EXAMPLE |
| --- |
| IRR (intermittent renewable resource) telemetered HSL (high sustained limit) = 150 MW |
| Droop = 0.05 or 5% (use 0.05 for calculation) |
| Governor Dead-Band = 0.017 Hz |
| Gain MW for 0.1 Hz = +/−5.03 MW/0.1 Hz |
| ΔMW Contribution = 5.03 * 10* +/−0.2 = +/−10.06 MW |
| Expected under-frequency response: +10.06 MW in 16 sec. for −0.2 Hz offset |
| Expected over-frequency response: −10.06 MW in 16 sec. for +0.2 Hz offset |
| Minimum accepted under-frequency response: +7.04 MW in 16 sec. for −0.2 Hz offset |
| Minimum accepted over-frequency response: −7.04 MW in 16 sec. for +0.2 Hz offset |
| Calculated droop for 8 MW increase in power output in 16 sec. for −0.2 Hz offset: |
| Calculated percent droop = −*100 = 6.25% | ment the microgrid may be used to act as a frequency stabilizer to a main grid 55 in conjunction with the disclosed system and method.

In an exemplary embodiment of the disclosed system and method the system 1 is configured and connected to the grid 55 behind the meter of a power generating system interconnection. In exemplified embodiments of the disclosed system and method, the system is configured and connected to the grid 55 in front of the meter at a point on the electrical grid 55.

Droop response traditionally has come from large synchronous generators 25 through a governor control methodology. This response has been controlled automatically by configuring specific settings that govern the generator's operation. Specifically, there is a range of operation that allows the frequency to deviate above and below the nominal frequency, which in North America is 60 Hz. Ibis deviation range is known as the deadband and is generally configured to be ±0.036 Hz though in some regions the setting is ±0.017 Hz. This allows the generator 25 to operate in a normal condition when the frequency is varying slightly above and below the nominal frequency of 60 Hz. Outside of this normal operation range, frequency control ensures the frequency is corrected and remains within its normal operating range.

For instance, in an under-frequency event a generator's output power is required to increase to inject additional power to the system, bringing up the frequency, with the intent to reach 60 Hz. In an over-frequency event, a generator's output is scaled back to allow frequency to drop back down to the desired 60 Hz.

Depending on the amount of active power that is required to be injected, a BA can determine how much power is required for the percentage change in frequency for their region. In other words, as the frequency increases or decreases outside of the normal operating range by 0.036 Hz, as a non-limiting example, a BA can instruct generators 25 to configure their available capacity to provide a specific output power percentage to meet the needs of that BA, allowing it to fulfill its reliability requirements.

In order to meet the regulations of BAs, traditional generators 25 had their operational output power curtailed as a percentage of their nameplate capacity, otherwise known as de-loading the generator 25. This curtailment is generally from 5%-10% of the rated nameplate capacity. Below is an excerpt from an Electricity Reliability Council of Texas In certain embodiments, and when referencing the ERCOT example, the optimal size of the energy storage system 10 and stored energy 15 is the expected under-frequency response in MW output, multiplied by the required sustaining time period, considering the actual MW response output as it is increasing (ramping time period) until the full expected MW output that is expected is reached.

In certain embodiments the output response from the energy storage system 10 and power conversion system 20 is immediate and the stored energy 15 is optimally pre-sized to ensure that the stored energy 15 is sized for the immediate output and the sustained response period in time, which can be seconds, minutes, or longer.

In certain embodiments the energy storage system's output response rate in MW is increased proportionally based on the capabilities of the energy storage system 10, or increased at a set output amount and controlled rate, which may be determined and controlled by the power conversion system 20, and the stored energy 15 is optimally pre-sized to meet the actual output power and duration of the power generation system requirements for the under-frequency response, which can be seconds, minutes, or longer.

Traditionally the electrical grid 55 kept a reserve capacity of rapidly available active power, commonly referred to as pre-curtailment, to allow the grid 55 to respond to frequency contingencies such as under-frequency events. Typically, the most severe events are under-frequency events caused by one or more generators 25 going off-line or tripping, or an intertie tripping.

Due to the rapid pace that our electrical grids 55 have been transitioning to renewable power generation through the installation of solar and wind facilities, and policy makers trying to incentivize this type of power generating system, BAs have not been able to keep up with the regulations. BAs are tasked to ensure enough droop response, or PFR, is available when a frequency event occurs. Statistically, over and under-frequency events, combined, occur on average between eighty and one hundred and fifty times per year. This is on average one event in every one to three days, which is a serious issue that BAs are forced to address while generally struggling to find economic and practical solutions.

In an exemplary embodiment the nominal frequency of the grid 55 is 60 Hz. In additional exemplary embodiments the nominal frequency of the grid 55 is 50 Hz. In certain embodiments the nominal frequency of the grid 55 is between 10 Hz to 100 Hz.

In an exemplary embodiment the the deadband setting is configured to be ±0.036 Hz. In additional embodiments the deadband setting is configured to be 0.017 Hz. In certain embodiments the deadband is configured to be a desired value between 0-10 Hz set by the grid operator, BA, or regulator.

In certain embodiments the droop response system 26 of the power generating system 25 is configured so that active power is allowed to increase when an under-frequency event is detected by the power generating system 25. In additional embodiments the droop response of the power generating system 25 is configured so that active power is not allowed to increase when an under-frequency event is detected by the power generating system 25. In certain embodiments a controller of a power generating system 25 is a flyball governor control. In additional embodiments the flyball governor control or equivalent control is adjusted to ensure that a power generating system 25 will trip offline from an under-frequency event before the power generating system 25 would attempt to respond to the under-frequency event. In additional embodiments, the flyball governor control or equivalent control is disabled for an under-frequency event. In yet additional embodiments, the flyball governor control or equivalent control is coordinated for an under-frequency event.

In certain embodiments the droop response system 26 of the power generating system 25 is configured so that active power is allowed to decrease when an over-frequency event is detected by the power generating system 25. In additional embodiments the droop response system of the power generating system 25 is configured so that active power is not allowed to decrease when an over-frequency event is detected by the power generating system 25. In certain embodiments the controller of a power generating system 25 is a flyball governor control. In additional embodiments the flyball governor control or equivalent control is adjusted to ensure that a power generating system 25 will trip offline from an over-frequency event before the power generating system 25 would attempt to respond to the over-frequency event. In additional embodiments the flyball governor control or equivalent control is disabled for an over-frequency event.

In certain embodiments the droop response of the energy storage system 10 is configured so that active power is allowed to increase when an under-frequency event is detected by the system coordinator 5. In additional embodiments the frequency response of the energy storage system 10 is configured so that active power is not allowed to increase when an under-frequency event is detected by the system coordinator 5. In certain embodiments the frequency control of an energy storage system 10 is a program or protocol instructing the power conversion system 20 to discharge stored energy 15. In additional embodiments the frequency control or equivalent control is adjusted to ensure that an energy storage system 10 will trip offline from an under-frequency event before the energy storage system 10 would attempt to respond to the under-frequency event. In additional embodiments the droop control or equivalent control of the energy storage system 10 is disabled for an under-frequency event.

In certain embodiments the droop response of the energy storage system 10 is configured so that active power is allowed to be absorbed into stored energy 15 when an over-frequency event is detected by the system coordinator

5. In additional embodiments the frequency response of the energy storage system 10 is configured so that active power is not allowed to be absorbed into stored energy 15 when an over-frequency event is detected by the system coordinator 5. In certain embodiments the frequency control of an energy storage system 10 is a program or protocol instructing the power conversion system 20 to absorb and store energy 15. In additional embodiments the frequency control or equivalent control 20 is adjusted to ensure that an energy storage system 10 will trip offline from an over-frequency event before the energy storage system 10 would attempt to respond to the over-frequency event. In additional embodiments the frequency control or equivalent control of the energy storage system 10 is disabled for an over-frequency event.

In certain embodiments the active power output of the energy storage system 10 of the electrical response system 1 is correlated to match the under-frequency power response requirement of the power generating system 25, which in certain embodiments may be a requirement of an established regulation, a requirement amount determined by a regulator, a requirement amount determined by a BA, a requirement amount determined by an interconnection requirement, a requirement amount determined by an interconnection test, an under-frequency event reaching the power generating system's full loading for a time period determined in advance, wherein the energy storage system 10 and stored energy 15 are optimally pre-sized to meet the said requirement or requirements. In certain embodiments the ramp rate, power (MW), and duration are used to determine total power output or input of the power conversion system 20 and total stored energy 15 of the energy storage system 10. In certain embodiments the ramp rate, power (MW), and duration are used to determine total power output or input of the power conversion system 20 and total stored energy 15 of the energy storage system 10 in order to optimally pre-size the energy storage system 10. In certain embodiments and as a non-limiting example, the system may have a 16 second ramp time to full output power with a sustained full MW response for about 30 seconds additionally as described by the ERCOT interconnection test for sustained PFR In certain embodiments and as a non-limiting example, the energy storage system 10 may have a response under 1 second, which may be a full power response or a ramp to full output power, with a sustained response for five minutes, or ten minutes or 15 minutes, or longer.

In certain embodiments the output power provided by the stored energy 15 of the energy storage system 10 of the electrical response system 1 is correlated to the output power of the power generating system 25. The size (MW) of the stored energy 15 of the energy storage system 10 is correlated to match the under-frequency power response and sustained duration requirements of the power generating system 25. In certain embodiments the requirements may be a requirement of an established regulation, a requirement duration determined by a regulator, a requirement duration determined by a BA, a duration requirement determined by an interconnection requirement, or a requirement duration determined by an interconnection test, thereby designed to optimally pre-size the energy storage system 10 and stored energy 15 to meet the requirement.

In certain embodiments the system and method control the SOC of the stored energy 15 in the energy storage system 10. In certain embodiments the system and method control the SOC of the energy storage system's stored energy 15 and correlate the SOC to meet the requirements of the power generating system 25 at different levels of output power from the power generating system 25. In certain embodiments the system and method control the SOC of the energy storage system's stored energy 15 dynamically in real-time to meet the requirements of the power generating system's output power level as the power generating system 25 output power level varies in real-time.

In certain embodiments the electrical response system 1 controls the charging, discharging, and charge holding patterns of the energy storage component 16 of the energy storage system 10 to provide the conditions for the energy storage component to maximize overall health and life expectancy. In certain embodiments of the system 1, supercapacitors are used as the energy storage component 16 of the system, and in additional embodiments the supercapacitors are charged to the desired voltage and allowed to self-discharge over a defined period of time. In additional embodiments the supercapacitors are then recharged to the desired voltage. In additional embodiments of the system 1, supercapacitors are used as the energy storage component 16 of the energy storage system 10 and are charged to the desired voltage while the coordinated power generating system 25 is operating and producing electricity, and then discharged when the coordinated power generating system 25 is not operating and not producing electricity.

In certain embodiments the system is designed to minimize the degradation of the energy storage system 10 and/or stored energy 15 over time. In certain embodiment the energy storage system 10 and/or stored energy 15 degradation is reduced over time by means of the charging, holding, and/or discharging profiles. In certain embodiments the energy storage system 10 and/or stored energy 15 degradation is reduced when the energy storage component 16 includes supercapacitors and the supercapacitors are discharged when not required to maintain a charge. In certain embodiments the energy storage system 10 and/or stored energy 15 degradation is reduced when the energy storage 15 includes batteries and the batteries are charged to an ideal SOC, which may include intermittent or regular trickle charging when not required to discharge.

In certain embodiments the energy storage system 10 includes energy storage cells assembled into modules/packs. In the certain embodiments the energy storage system 10 includes energy storage cells assembled into modules/packs, which are then assembled into stacks. In certain embodiments the energy storage system 10 includes energy storage cells assembled into modules/packs, which are then assembled into stacks, which are then assembled into full systems. In certain embodiments of the system 1, modules/packs and stacks are capable of being swapped out and replaced with additional modules/packs and stacks, which in certain additional embodiments may also include swapping out while in operation, otherwise known as hot swapping.

In certain embodiments, sensors 30A, 30B, 30C, 30D are used to perform various information gathering functions connected to the grid. In certain embodiments, sensors 30A, 30B, 30C, 30D are used by the energy storage system 10 to measure, to give a few non-limiting examples, grid frequency, grid voltage, grid phase, grid phase angle, grid reactive power, grid system information, output power to the grid, output information to the grid, input power from the grid, input information from the grid.

In an exemplary embodiment of the system 1, sensors 30A, 30B, 30C, 30D are used to perform various system feedback information collecting functions. In certain embodiments, sensors 30A, 30B, 30C, 30D are used by the energy storage system 10 to measure, to give a few non-limiting examples, cell, pack, module and stack temperature which may include measuring devices such as a thermometer or a thermocouple. In certain embodiments, sensors 30A, 30B, 30C, 30D are used by the energy storage system 10 to measure, to give a few non-limiting examples, cell, pack, module and stack charge state including single cell, string and parallel voltage state, output power of the system, output information of the power conversion system 20, input power of the power conversion system 20, input information of the energy storage system 10.

In the certain embodiments the system detects and determines the state of health (SOH) of the energy storage component 16. In certain embodiments the energy storage component 16 is an energy storage cell or cells. In an exemplary embodiment the energy storage system cell or cells are supercapacitors. In an exemplified embodiment the energy storage system cell or cells are batteries. In certain embodiments energy storage SOH is determined by charging and discharging the stored energy 15 and comparing the charge profiles and duration, which may include multiple charge and discharge cycles.

The droop settings that a BA determines for a specific region are based upon the most significant negative effect that could occur in their balancing region, often called the MSSC, which is the quantity of active power that it would take to alleviate this negative effect. For instance, the droop settings are usually based on the event that the largest generator 25 in the fleet unexpectedly goes off-line or trips. By determining the amount of active power needed to arrest this loss of generating capacity, a BA then determines the real active power needed, generally from 60 Hz to a range of 61 to 59 Hz. This allows the BA to determine the exact amount of real active power needed to be injected across the fleet for each 0.1 Hz frequency deviation outside of the dead-band.

Once a determination of required active power has been made, the BA instructs individual generators 25 to adjust their droop settings to provide the correlating amount of active power when the frequency is outside the dead-band parameter. This traditionally was accomplished by synchronous generators, and which can also be accomplished with asynchronous inverter-based generators, though in order for this strategy to be implemented with renewable based generators, active pre-curtailment (headroom) is required.

Multiple studies have been concluded, as well as there are many studies ongoing, that show that in order for a renewable generator 25 to provide active power when needed this pre-curtailment or scaling back of the power is required, also called de-loading. Another determining factor for the amount of active power of renewable generator 25 is based on the current magnitude of the output of the generator 25. For instance, when a solar farm is producing power during the peak production time of the day and it is a sunny day, if the solar farm has been pre-curtailed, and based on the droop settings implemented by the BA, requiring a correlated pre-curtailment, the solar farm would be able to output droop requirements to help alleviate in this case an under-frequency event.

Figure 2:
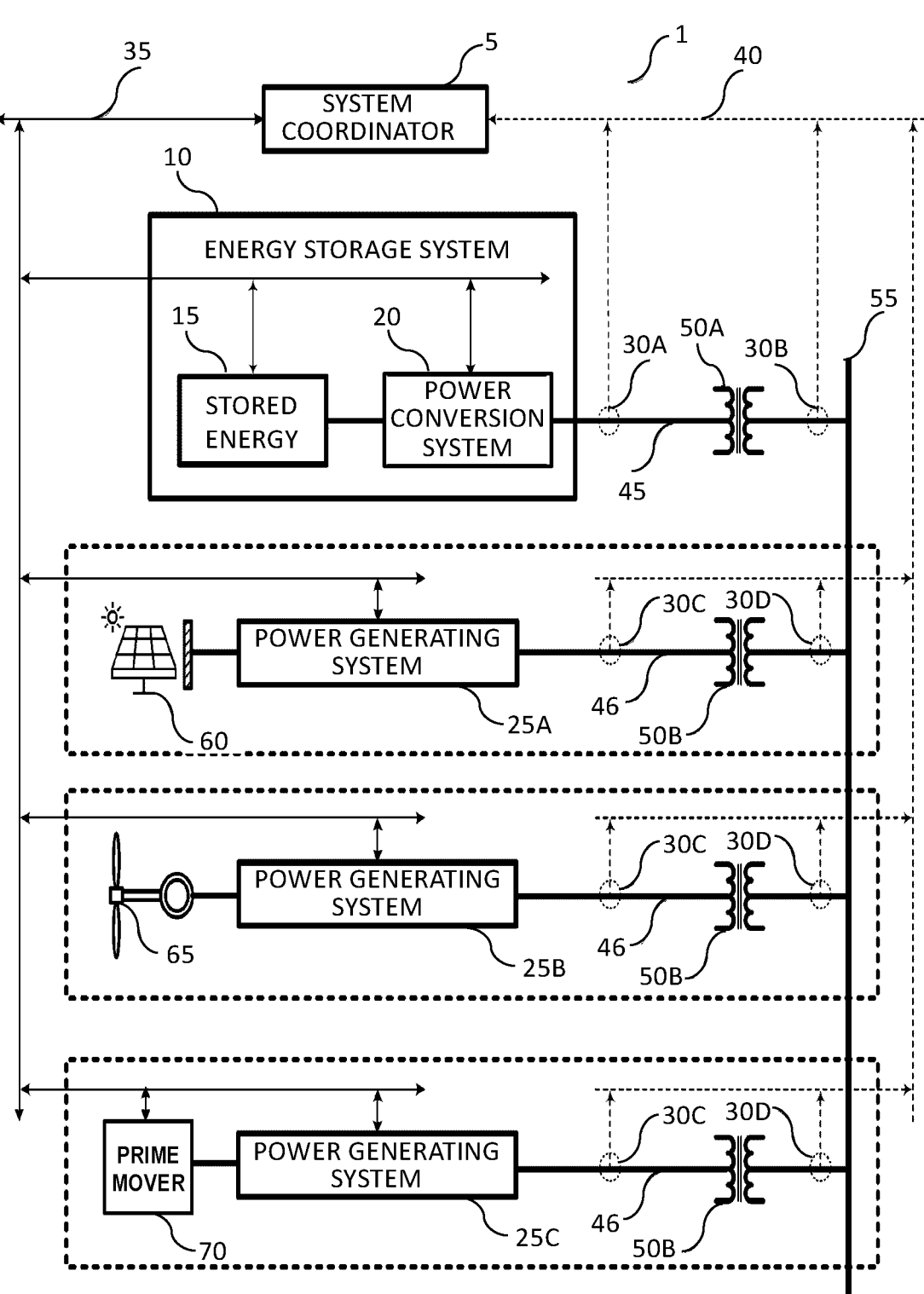
FIG. 2 is a functional block diagram of the coordinated electrical response system depicting multiple alternative embodiments for the power generating system.

Additionally, a solar farm could also scale back its output to provide an over-frequency response in the event of an over-frequency event occurring. Complications arise when taking into account that renewables, specifically solar and wind, are constantly varying their output power based on environmental effects. This results in that the magnitude of the output can only be proportional to the current, real-time output of the solar and wind farm, when responding to under-frequency events, and to a certain extent responding to over-frequency events FIG. 2 is a functional block diagram depicting an exemplified embodiment of the coordinated electrical response system 1. In certain embodiments of the coordinated electrical response system 1, the system coordinator 5 determines the commands to the systems so that the required responses to over-frequency events of the grid 55 are provided by the power generating systems 25A, 25B, 25C, and the required responses to under-frequency events of the grid 55 are provided by the energy storage system 10. In certain embodiments of the coordinated electrical response system 1, the response commands to over-frequency events and under-frequency events are determined in advance of an event. In certain embodiments the system coordinator 5 determines system commands and responses to over-frequency events and under-frequency events at the time of the event, in real-time. In certain embodiments the system and method 1 utilize automatic commands and responses to over-frequency events and under-frequency events at the time of the event. In certain embodiments the energy storage system 10 and stored energy 15 are pre-sized to meet both the power output requirement and duration requirement for under-frequency events. In certain embodiments the power generating systems 25A-C are designed to meet both power output requirement and duration requirement for normal power generation operations and for over-frequency events. In alternate embodiments the power generating systems 25A, 25B, 25C may comprise a number of, to give non-limiting examples, photovoltaic power sources 60, wind power sources 65, prime movers 70 or a plurality or combination thereof, as means for generating an output power that can be sent to an electrical grid 55 and be a useful form of electricity generation.

In certain embodiments the system coordinator 5 instructs the energy storage system 10 and stored energy 15 to discharge and provide active power to the grid 55 during an under-frequency event by means of the power conversion system 20. In certain embodiments at least one of the power generating systems 25A-C reduces its active power output to the grid 55 during an over-frequency event controlled by its governor control systems, or equivalent response systems. In certain embodiments the system coordinator 5 instructs at least one of the power generating systems 25A-C to reduce its active power output to the grid 55 during an over-frequency event by means of the control lines 35. In certain embodiments at least one of the power generation systems 25A-C reduces its active power output to the grid 55 during an over-frequency event, controlled by its governor control system, or equivalent response system, and is in data communication with the system coordinator by means of the data lines 40. In certain embodiments the system coordinator 5 instructs at least one of the power generating systems 25A-C to reduce its active power output to the grid 55 during an over-frequency event by means of the control lines 35 as a response to the data received from one or more optional sensors such as sensor 30A, sensor 30B, sensor 30C, sensor 30D via the data lines 40.

In certain embodiments the system coordinator 5 instructs the energy storage system 10 and energy storage component 16 to charge and/or discharge, and/or provide active power to the grid 55 during an under-frequency event, by means of one or more control lines 35 to the power conversion system 20, which in certain embodiments may utilize a DC/AC inverter and/or DC/DC converter. In certain embodiments a response or instruction by the energy storage system 10 may be a result of information received from one or more optional sensors such as sensor 30A, sensor 30B, sensor 30C, sensor 30D. In certain embodiments the information received from one or more of the optional sensors (sensor 30A, sensor 30B, sensor 30C, sensor 30D) is sent to the system coordinator 5 via one or more data lines 40. In certain embodiments the system coordinator 5 instructs the power conversion system 20 to discharge stored energy 15 from the energy storage system 10 to the grid 55 through a transformer 50A and via one or more power lines 45. In certain embodiments the transformer 50A is omitted from the system. In certain embodiments the transformer 50A is a part of the power conversion system 20. In additional alternative embodiments the system may also comprise a plurality of transformers 50A.

In certain embodiments a power generating system 25A-C reduces its active power to the grid 55 during over-frequency events by means of one or more control lines 35 and as a response to information received from one or more optional sensors such as sensor 30A, sensor 30B, sensor 30C, sensor 30D. In certain embodiments the information received from one or more of the optional sensors (sensor 30A, sensor 30B, sensor 30C, sensor 30D) is sent to the system coordinator 5 via one or more data lines 40. In certain embodiments the system coordinator 5 is in communication with the power generating systems 25A-C, which are controlled by their governor control systems, or equivalent response systems, which instruct a power generating system 25A-C to reduce its active power output to the grid 55 through a transformer 50B and via one or more power lines 46. In certain embodiments the transformer 50B is omitted from the system. In certain embodiments the transformer 50B is a part of the power generation system 25. In additional alternative embodiments the system may also comprise a plurality of each of the transformers 50B.

In certain embodiments the system may also comprise a plurality of optional sensors 30A, 30B, 30C, 30D, a single or plurality of control lines 35, data lines 40, power lines 45, 46, transformers 50A, 50B, a grid 55, photovoltaic power sources 60, wind power sources 65, and one or more prime movers 70 connected to one or more power generation systems 25A-C.

Figure 3:
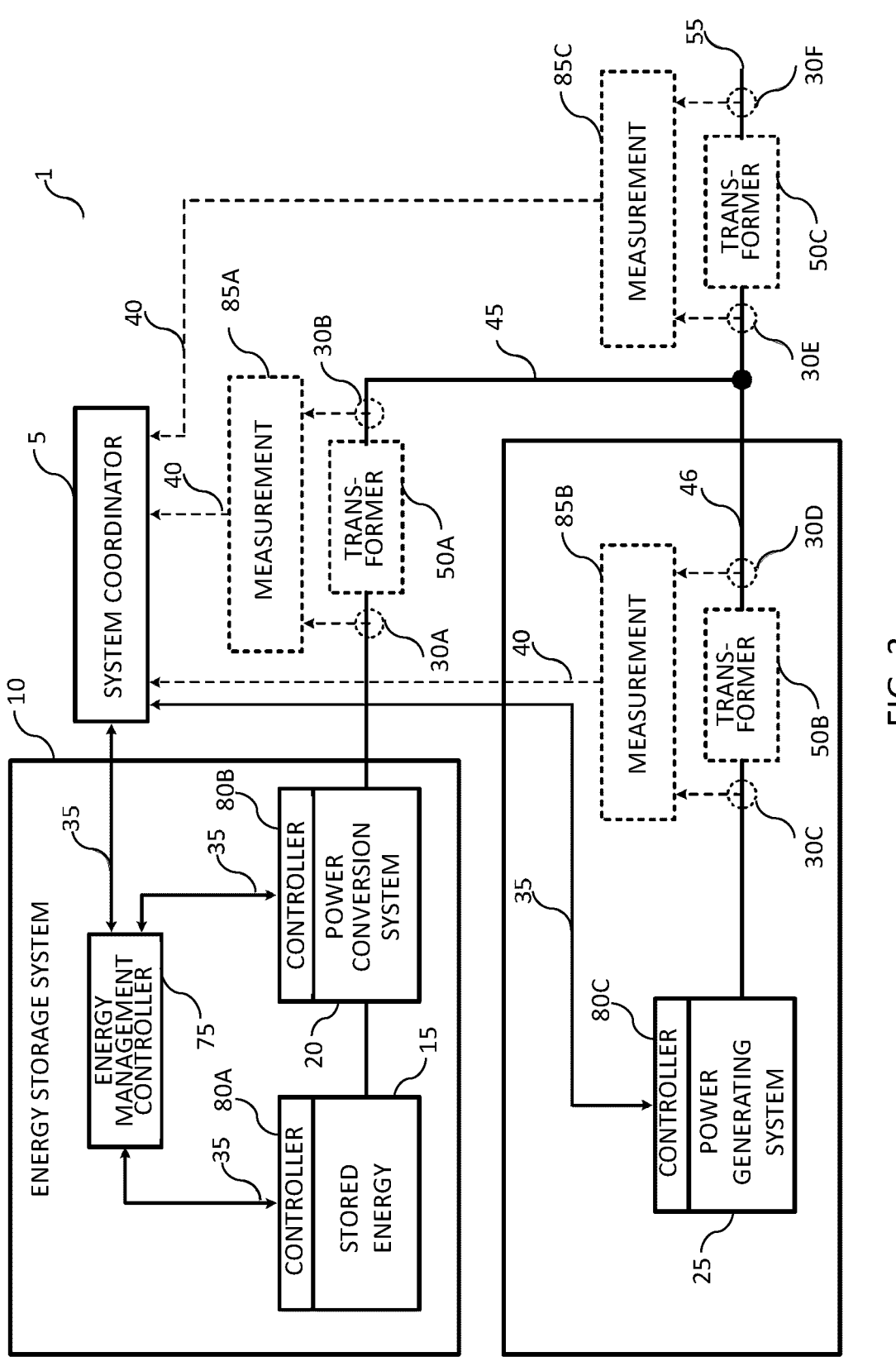
FIG. 3 is a functional block diagram depicting multiple components of the coordinated electrical response system, of which some are optional.

FIG. 3 is a functional block diagram depicting multiple components and optional components of the coordinated electrical response system 1. In certain embodiments of the coordinated electrical response system 1, the system coordinator 5 determines the commands to the system so that the required responses to over-frequency events of the grid 55 are provided by the power generating system 25, which is controlled by a controller 80C by means of control lines 35, wherein power is dispatched to the grid 55 by means of the power lines 46 through one or a plurality of transformers 50B, 50C, and which may additionally use one or a plurality of measurements 85B, 85C of power and the power profiles by means of one or a plurality of sensors 30C, 30D, 30E, 30F, by means of data lines 40.

In certain embodiments of the coordinated electrical response system 1, the system coordinator 5 determines the commands to the system so that the required responses to under-frequency events of the grid 55 are provided by the energy storage system 10, which includes the energy management controller 75, stored energy 15 and stored energy controller 80A, the power conversion system 20 and power conversion controller 80B, which in certain embodiments may utilize a DC/AC inverter and/or DC/DC converter, by means of control lines 35. In certain embodiments the energy management controller 75 can be omitted from the system, where the stored energy 15 and power conversion system 20 are controlled and managed by system coordinator 5 through stored energy controller 80A and power conversion controller 80B respectively by means of control lines 35. In certain embodiments power is dispatched to the grid 55 by means of the power lines 45 through one or a plurality of transformers 50A, 50C, and which may additionally include one or a plurality of measurements 85A, 85C of the system feedback by means of one or a plurality of sensors 30A, 30B, 30E, 30F, by means of data lines 40.

Figure 4:
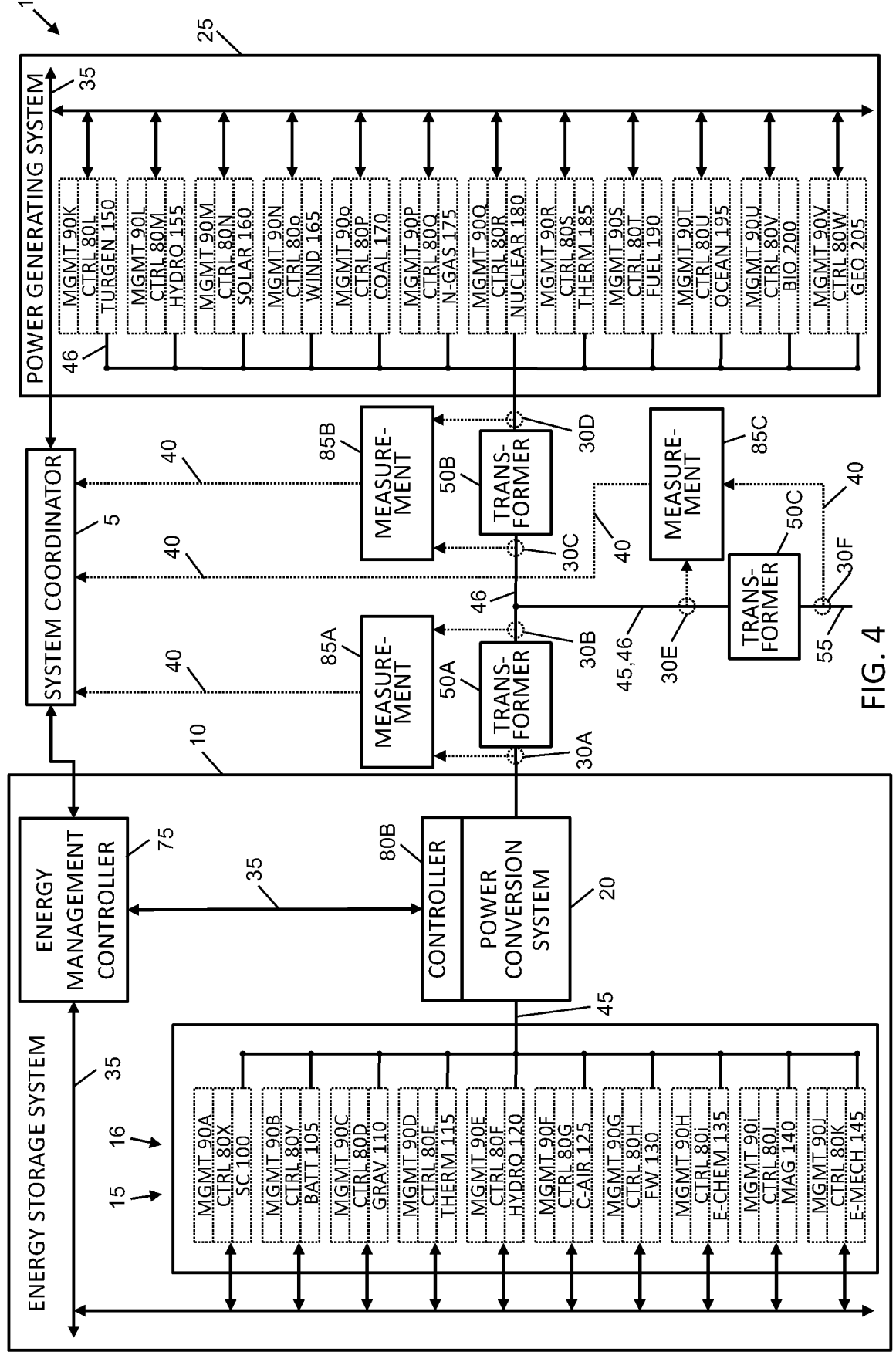
FIG. 4 is a functional block diagram of the coordinated electrical response system depicting multiple alternative embodiments for the energy storage component of the system and depicting multiple alternative embodiments for the power generating system.

FIG. 4 is a functional block diagram of the coordinated electrical response system 1 depicting multiple alternative embodiments for the energy storage component 16 of the system and depicting multiple alternative embodiments for the power generating system.

In certain embodiments of the coordinated electrical response system 1, the system coordinator 5 determines the commands to the system so that the required responses to over-frequency events of the grid 55 are provided by the power generating system 25, which may be controlled by a controller 80L, 80M, 80N, 80o, 80P, 80Q, 80R, 80S, 80T, 80U, 80V, 80W, and which may be managed by a management system 90K, 90L, 90M, 90N, 90o, 90P, 90Q, 90R, 90S, 90T, 90U, 90V, by means of control lines 35, wherein power is dispatched to the grid 55 by means of the power lines 46 through one or a plurality of transformers 50B, 50C, and which may additionally include one or a plurality of measurements 85B, 85C of the system feedback, by means of one or a plurality of sensors 30C, 30D, 30E, 30F, by means of data lines 40.

In certain embodiments the power generating system 25 may be composed of a turbine driven generator 150, which may be controlled by one or more controllers 80L and/or managed by a management system 90K. In certain embodiments the power generating system 25 may be composed of a hydroelectric power station 155, which may be controlled by one or more controllers 80M and/or managed by a management system 90L. In certain embodiments the power generating system 25 may be composed of a solar power station 160, which may be controlled by one or more controllers 80N and/or managed by a management system 90M. In certain embodiments the power generating system 25 may be composed of a wind power station 165, which may be controlled by one or more controllers 80o and/or managed by a management system 90N. In certain embodiments the power generating system 25 may be composed of a coal power station 170, which may be controlled by one or more controllers 80P and/or managed by a management system 90o. In certain embodiments the power generating system 25 may be composed of a natural gas power station 175, which may be controlled by one or more controllers 80Q and/or managed by a management system 90P. In certain embodiments the power generating system 25 may be composed of a nuclear power station 180, which may be controlled by one or more controllers 80R and/or managed by a management system 90Q. In certain embodiments the power generating system 25 may be composed of a thermal power station 185, which may be controlled by one or more controllers 80S and/or managed by a management system 90R. In certain embodiments the power generating system 25 may be composed of a fuel driven power station 190, which may be controlled by one or more controllers 80T and/or managed by a management system 90S. In certain embodiments the power generating system 25 may be composed of an ocean driven power station 195, which may be controlled by one or more controllers 80U and/or managed by a management system 90T. In certain embodiments the power generating system 25 may be composed of a biomass power station 200, which may be controlled by one or more controllers 80V and/or managed by a management system

90U. In certain embodiments the power generating system 25 may be composed of a geothermal power station 205, which may be controlled by one or more controllers 80W and/or managed by a management system 90V. In certain embodiments the power generating system 25 may be composed of one or a plurality of a turbine driven generator 150, a hydroelectric power station 155, a solar power station 160, a wind power station 165, a coal power station 170, a natural gas power station 175, a nuclear power station 180, a thermal power station 185, a fuel driven power station 190, an ocean driven power station 195, a biomass power station 200, a geothermal power station 205, or any combination thereof.

In certain embodiments of the coordinated electrical response system 1, the system coordinator 5 determines the commands to the systems so that the required responses to under-frequency events of the grid 55 are provided by the energy storage system 10, which includes an energy management controller 75 that controls the stored energy 15, and in certain embodiments includes a power conversion controller 80B that controls the power conversion system 20 by means of control lines 35. In certain embodiments the energy management controller 75 can be omitted from the system, where the stored energy 15 and power conversion system 20 are controlled and managed by system coordinator 5 through a stored energy controller and power conversion controller 80B respectively by means of control lines 35. In certain embodiments power is dispatched to the grid 55 by means of the power lines 45 through one or a plurality of transformers 50A, 50C, and which may additionally include one or a plurality of measurements 85A, 85C of the system feedback by means of one or a plurality of sensors 30A, 30B, 30E, 30F, by means of data lines 40.

In certain embodiments the energy storage system 10 may be composed of supercapacitor energy storage 100, which may be controlled by one or more controllers 80X and/or managed by a management system 90A. In certain embodiments the energy storage system 10 may be composed of battery energy storage 105, which may be controlled by one or more controllers 80Y and/or managed by a management system 90B. In certain embodiments the energy storage system 10 may be composed of gravitational energy storage 110, which may be controlled by one or more controllers 80D and/or managed by a management system 90C. In certain embodiments the energy storage system 10 may be composed of thermal energy storage 115, which may be controlled by one or more controllers 80E and/or managed by a management system 90D. In certain embodiments the energy storage system 10 may be composed of hydroelectric energy storage 120, which may be controlled by one or more controllers 80F and/or managed by a management system 90E. In certain embodiments the energy storage system 10 may be composed of compressed air energy storage 125, which may be controlled by one or more controllers 80G and/or managed by a management system 90F. In certain embodiments the energy storage system 10 may be composed of flywheel energy storage 130, which may be controlled by one or more controllers 80H and/or managed by a management system 90G. In certain embodiments the energy storage system 10 may be composed of electrochemical energy storage 135, which may be controlled by one or more controllers 80i and/or managed by a management system 90H. In certain embodiments the energy storage system 10 may be composed of magnetic energy storage 140, which may be controlled by one or more controllers 80J and/or managed by a management system 90i. In certain embodiments the energy storage system 10 may be composed of electromechanical energy storage 145, which may be controlled by one or more controllers 80K and/or managed by a management system 90J. In certain embodiments the energy storage system 10 may be composed of one or a plurality of supercapacitor energy storage 100, battery energy storage 105, gravitational energy storage 110, thermal energy storage 115, hydroelectric energy storage 120, compressed air energy storage 125, flywheel energy storage 130, electrochemical energy storage 135, magnetic energy storage 140, electromechanical energy storage 145, or any combination thereof.

FIG. 5 is an example method for optimally pre-sizing the energy storage system and stored energy to meet the requirements of a power generating system by coordinating the over-frequency and under-frequency response of the power generating system in relation to a grid frequency event. The method 350 starts in step 355.

In step 360 and according to an example embodiment of the invention, determine the size (MW) of a power generating system.

In step 365 and according to an example embodiment of the invention, determine the required droop settings (or equivalent) and frequency deadband settings (or equivalent) for the power generating system.

In step 370 and according to an example embodiment of the invention, determine the extra power output (MW) requirements of the power generating system for an under-frequency event.

In step 375 and according to an example embodiment of the invention, determine the duration requirements in seconds, or in minutes, or longer of the power generating system for an under-frequency event.

In step 380 and according to an example embodiment of the invention, optimally pre-size the energy storage systems power output (MW) to meet the requirements of the power generating system. Pre-sizing this power output involves installing in the system, before it is commissioned, an energy storage component 16 that is able to provide these power requirements. This also entails ensuring that other components, such as the power converter system 20, are also rated to handle the required power output.

In step 385 and according to an example embodiment of the invention, optimally pre-size the energy storage system's stored energy to meet the requirements of the power generating system. Pre-sizing the stored energy involves charging the energy storage component to the appropriate charge level in order to meet the requirements. For example, if the generator is running at maximum capacity, i.e. nameplate capacity, then the energy storage component may be fully charged. However, if the generator is running at 60% capacity, then the energy storage component may be charged to 60%. Pre-sizing the amount of energy in the energy storage component may be done prior to the generator switching on, or as the generator is ramping up its output. In either case, the pre-sizing of the amount of energy in the energy storage component is determined and stored before the next expected frequency event. The method ends in step 390.

As an exemplary calculation for the method 350, 1. the rated active power output of a power generating system is denoted as Prated in the unit of MW,
2. the required droop setting is denoted as $d_\%$ in the unit of percentage (%),
3. the grid rated nominal frequency is denoted as $f_{rated}$ in the unit of Hz,
4. the deadband setting is denoted as $f_{setting}$ in the unit of Hz, 5. the upper limit of the deadband frequency is denoted as $f_{deadband\_upper}$ in the unit of Hz,
6. the lower limit of the deadband frequency is denoted as $f_{deadband\_lower}$ in the unit of Hz,
7. the frequency profile used when pre-sizing the energy storage system and stored energy is denoted as $f_{profile}$,
8. the grid frequency deviation from the deadband based on the frequency profile is denoted as $\Delta f_{grid}$ in the unit of Hz, which is also denoted as $\Delta f_{grid\_\%}$ when it is in the unit of %,
9. the timestamp of the moment when frequency profile becomes higher than the upper limit of the deadband frequency $f_{deadbana\_upper}$ in an over-frequency event and lower than the lower limit of the deadband frequency $f_{deadband\_lower}$ in an under-frequency event is denoted as $T_0$,
10. the maximum duration requirement of the event is denoted as $\Delta T_{max}$ in the unit of seconds,
11. the maximum of the active power output required for the grid frequency event is denoted as $\Delta p_{max}$ in the unit of MW,
12. the system active power out headroom is denoted as $p_{headroom}$ in the unit of MW,
13. the active power output profile used when pre-sizing the energy storage system and stored energy is denoted as $\Delta p_{profile}$ in the unit of MW, which is also denoted as $\Delta p_{profile\_\%}$ when it is in the unit of %,
14. the maximum of the energy required for the grid frequency event is denoted as $\Delta e_{max}$ in the unit of MWh,
15. the energy storage system efficiency is denoted as $\eta_\%$ in the unit of %,
16. the incremental change of active power requirement during a frequency event is denoted as $\Delta p$ in the unit of MW,
17. the incremental change of the energy required during a frequency event is denoted as $\Delta e$ in the unit of MWh.

Then, $$\begin{cases} f_{deadband\_upper} = f_{rated} + |f_{setting}| \\ f_{deadband\_lower} = f_{rated} - |f_{setting}| \end{cases}$$

Case 1: When $f_{deadband\_upper} \geq f_{profile} \geq f_{deadband\_lower}$, $$\Delta f_{grid} = 0$$

$$\Delta p_{profile} = 0$$

Therefore, $$\Delta p = 0$$

$$\Delta e = 0$$

Case 2: When $f_{profile} > f_{deadband\_upper}$, i.e. an over-frequency event, $$\Delta f_{grid} = f_{profile} - f_{deadband\_upper}$$

$$\Delta f_{grid\_\%} = \frac{\Delta f_{grid}}{f_{deadband\_upper}} \times 100\%$$

-continued $$\Delta p_{profile\_\%} = \frac{\Delta f_{grid\_\%}}{d_{\%}} \times 100\%$$

$$\Delta p = \Delta p_{profile\_\%} \times p_{rated}$$

In an over-frequency event, $\Delta p$ is the amount of power output to be reduced by the power generating system.

Case 3: When $f_{profile} < f_{deadband\_lower}$, i.e. an under-frequency event, $$\Delta f_{grid} = f_{deadband\_lower} - f_{profile}$$

$$\Delta f_{grid\_\%} = \frac{\Delta f_{grid}}{f_{deadband\_lower}} \times 100\%$$

$$\Delta p_{profile\_\%} = \frac{\Delta f_{grid\_\%}}{d_{\%}} \times 100\%$$

$$\Delta p_{\%} = \frac{\Delta p_{profile\_\%}}{\eta_{\%}} \times 100\%$$

$$\Delta p = \Delta p_{\%} \times p_{rated}$$

The maximum power output requirement for the under-frequency event is defined by the system power headroom, which gives:

$$\Delta p_{max} = p_{headroom}$$

Therefore, if $\Delta p > \Delta p_{max}$, then $\Delta p = \Delta p_{max}$
To calculate the energy requirement considering the event duration requirement $\Delta T_{max}$, $$\Delta e = \frac{\int_{T_0}^{T_0 + \Delta T_{max}} \Delta p \times dt}{3600}$$

For the worse case where $\Delta p$ is equal to $\Delta p_{max}$ during the period of time from $T_0$ to $T_0 + \Delta T_{max}$, and then:

$$\Delta e_{max} = \frac{\int_{T_0}^{T_0 + \Delta T_{max}} \Delta p \times dt}{3600} = \frac{\Delta p_{max} \times \Delta T_{max}}{3600}$$

The $\Delta p$ defines the additional power output (MW) requirements of the power generating system for an under-frequency event, in step 370. The $\Delta e$ is defined by the duration requirements in seconds, or in minutes, or longer of the power generating system for an under-frequency event in step 375, multiplied by $\Delta p$. Based on the step of 370, the method will optimally pre-size the energy storage system power output in MW, in step 380. Based on the step of 375, the method will optimally pre-size the stored energy in MWh, in step 385.

Traditionally, a power generating system without the embodiment of the invention keeps a reserve capacity of the active power in order to provide for $\Delta p$ and $\Delta p_{max}$, commonly referred to as pre-curtailment or headroom, to allow a response to under-frequency events. Instead, the present invention allows a power generating system to operate at nameplate capacity without any headroom (i.e. operating normally), because the energy storage system provides the headroom. For example, a power generating system may have a nameplate capacity of 100 MW. Without the invention, the power generating system would normally operate at, for example, 94 MW with a 6 MW headroom. With the invention, however, the power generating system may normally operate at an output of 100 MW, in conjunction with an energy storage system with an output power capability of 6 MW. The capacity of the energy storage system in this case may be, for example, 1.5 MWh, which, if fully charged, allows stored power to be provided to the grid for ¼, hour at the full 6 MW rating.

Figure 6:
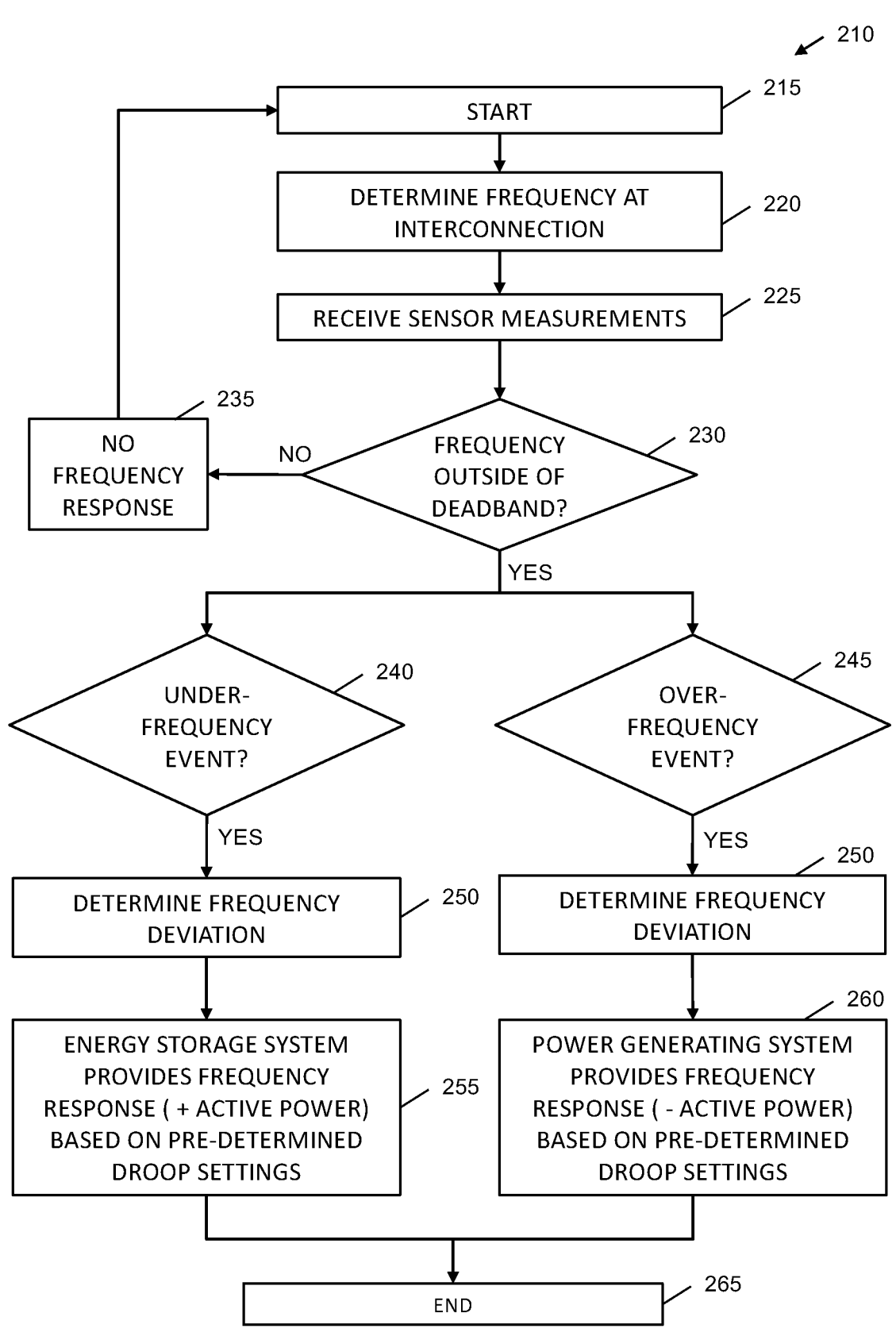
FIG. 6 is an example method for controlling and coordinating the electrical response of a power generating system for energy storage device in relation to a grid frequency event.

FIG. 6 is an example method 210 for coordinating and controlling the electrical response from a power generation system and energy storage system in relation to a grid frequency event. The method 210 starts in step 215.

In step 220 and according to an example embodiment of the invention, the electrical response system determines the frequency at the point of interconnection between the generator and the grid.

In step 225 and according to an example embodiment of the invention the system receives sensor measurements.

In step 230 and according to an example embodiment of the invention, the electrical response system determines if the frequency of the generator is outside of the deadband.

In step 235 and according to an example embodiment of the invention, if the electrical response system determines that the frequency is not outside of the deadband, then no frequency response occurs.

In step 240 and according to an example embodiment of the invention, the electrical response system determines that it is an under-frequency event.

In step 250 and according to an example embodiment of the invention, the electrical response system determines the frequency deviation.

In step 255 and according to an example embodiment of the invention, the energy storage system provides a frequency response, by adding active power based on pre-determined droop settings.

In step 245 and according to an example embodiment of the invention, the electrical response system determines that it is an over-frequency event.

In step 250 and according to an example embodiment of the invention, the electrical response system determines the frequency deviation.

In step 260 and according to an example embodiment of the invention, the power generating system provides a frequency response, by reducing active power based on pre-determined droop settings. The method ends in step 265.

Figure 7:
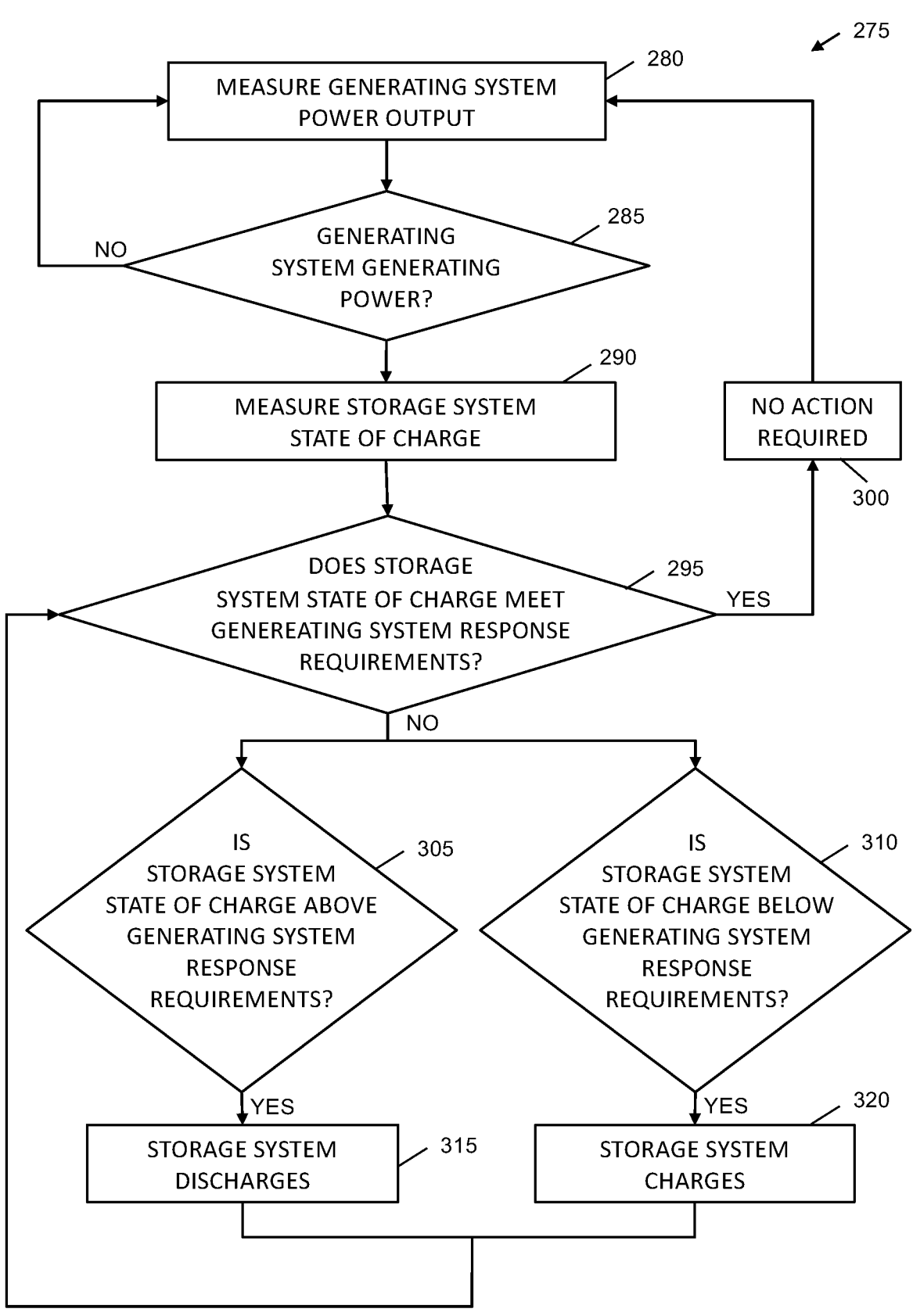
FIG. 7 is an example method for controlling and maintaining the appropriate SOC of the stored energy of the energy storage system in relation to the active power output of a power generating system and required under-frequency response.

FIG. 7 is an example method 275 for coordinating and maintaining the appropriate SOC of the stored energy component in relation to a power generating system's active power output level and/or response requirements and the required under-frequency response.

The method 275 starts in block 280. In step 280 and according to an example embodiment of the invention, the electrical response system measures the power generating system power output.

In step 285 and according to an example embodiment of the invention the electrical response system determines if the power generating system is generating power. If the answer to whether the power generating system generating power is "No", then the system reverts to step 280. If the answer to whether the power generating system is generating power is "Yes" then the method moves to step 290.

In step 290 and according to an example embodiment of the invention, the electrical response system measures the current SOC of the energy storage system's stored energy.

In step 295 and according to an example embodiment of the invention, the electrical response system determines if the SOC of the stored energy in the energy storage system is equal to the power output level and/or response requirements of the power generating system. If the answer to whether the SOC of the stored energy in the energy storage system is equal to the power output level and/or response requirements of the power generation system is "Yes", then the method moves to step 300. In step 300 and according to an example embodiment of the invention, the electrical response system determines that no action is required.

If the answer to whether the SOC of the stored energy in the energy storage system is equal to the power output level and/or response requirements of the power generation system is "No", then the method moves to step 305 or step 310. If the SOC of the stored energy in the energy storage system is above the power output level and/or response requirements of the power generation system, the method moves to step 305. The method moves to step 310 if the SOC of the stored energy in the energy storage system is below the power output and response requirements of the power generation system.

In step 305 and according to an example embodiment of the invention, the electrical response system determines that the SOC of the stored energy in the energy storage system is above the power output level and/or response requirements of the power generating system, and then the method moves to step 315. In step 315 and according to an example embodiment of the invention, the power generating system begins discharging stored energy 315.

In step 310 and according to an example embodiment of the invention, the electrical response system determines that the SOC of the stored energy in the energy storage system is below the power output level and/or response requirements of the power generating system, and then the method moves to step 320. In step 320 and according to an example embodiment of the invention, the power generating system begins charging stored energy 320.

The method continues until the method ends in step 300 when the system determines that no action is required 300. At intervals, the method starts again at step 280 as the generator output may change with time. In some embodiments, the SOC may follow the generator output proportionally, in real-time. In other embodiments, the SOC may proportionally follow a rolling average of the generator output, for example an average taken over 10 minutes, 1 hour or 3 hours. These two operational schemes are used for variable resources where grid operators may only require a certain proportion of frequency response based on the real-time output of a variable renewable resource such as a wind or solar farm, and instead of just having the energy bank always fully charged or fully discharged, it may be better for the health of the battery pack to sit at a mid-range or median level of charge. Therefore, following the real-time output of a variable renewable resource would help in life expectancy of the battery pack.

Figure 8:
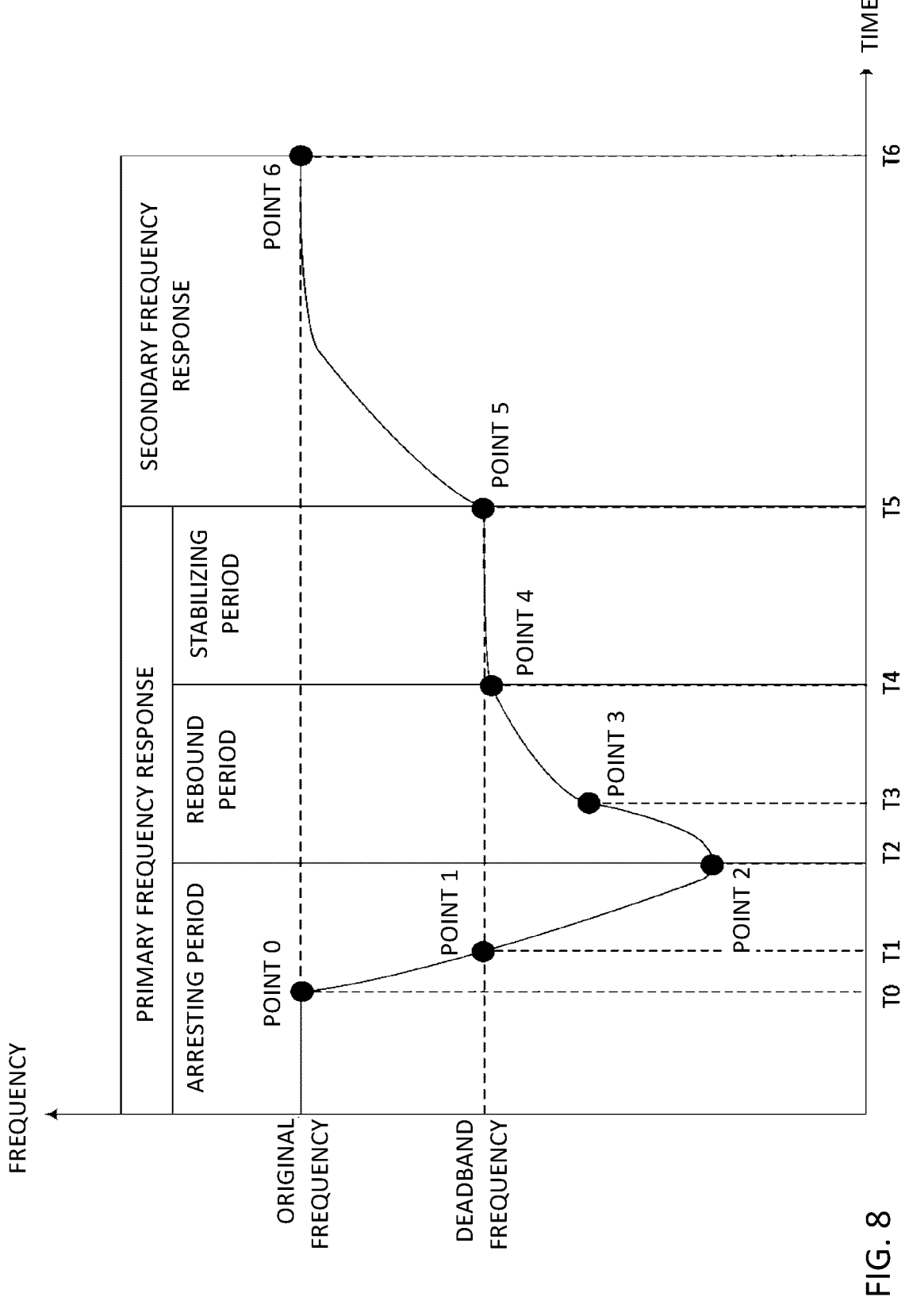
FIG. 8 is an example chart depicting a frequency control power curve for a typical under-frequency event according to an exemplary embodiment of the invention.

FIG. 8 is an example chart depicting a frequency control power curve for a typical under-frequency event according to an exemplary embodiment of the invention. In this example chart the original frequency is at Point 0. Point 1 is the point at which the frequency has left a specified acceptable range defined by the deadband and begun an under-frequency event. Point 2 is defined by the frequency nadir point, the lowest frequency in an under-frequency event.

Points 0, 1, and 2 define the arresting period as the PFR begins to add active power and stop the fall in frequency. This arresting period is shown with time references T0, T1, and T2. The next phase is the rebound period ranging from Point 2 to Point 3, and from Point 3 to Point 4, and from time period T2 to T3 and then from T3 to T4. During this rebound period the frequency begins its increase towards or back to the deadband. The next period is the stabilizing period ranging from Point 4 to Point 5, and from time period T4 to T5. During this stabilizing period the frequency event has been stabilized, which is generally the main responsibility of the PFR The next phase is secondary frequency response from Point 5 to Point 6, and from time period T5 to T6. During this phase, secondary, more slowly responding technologies continue to add active power and ensure that the frequency remains within the deadband and returns to the original desired frequency.

Figure 9:
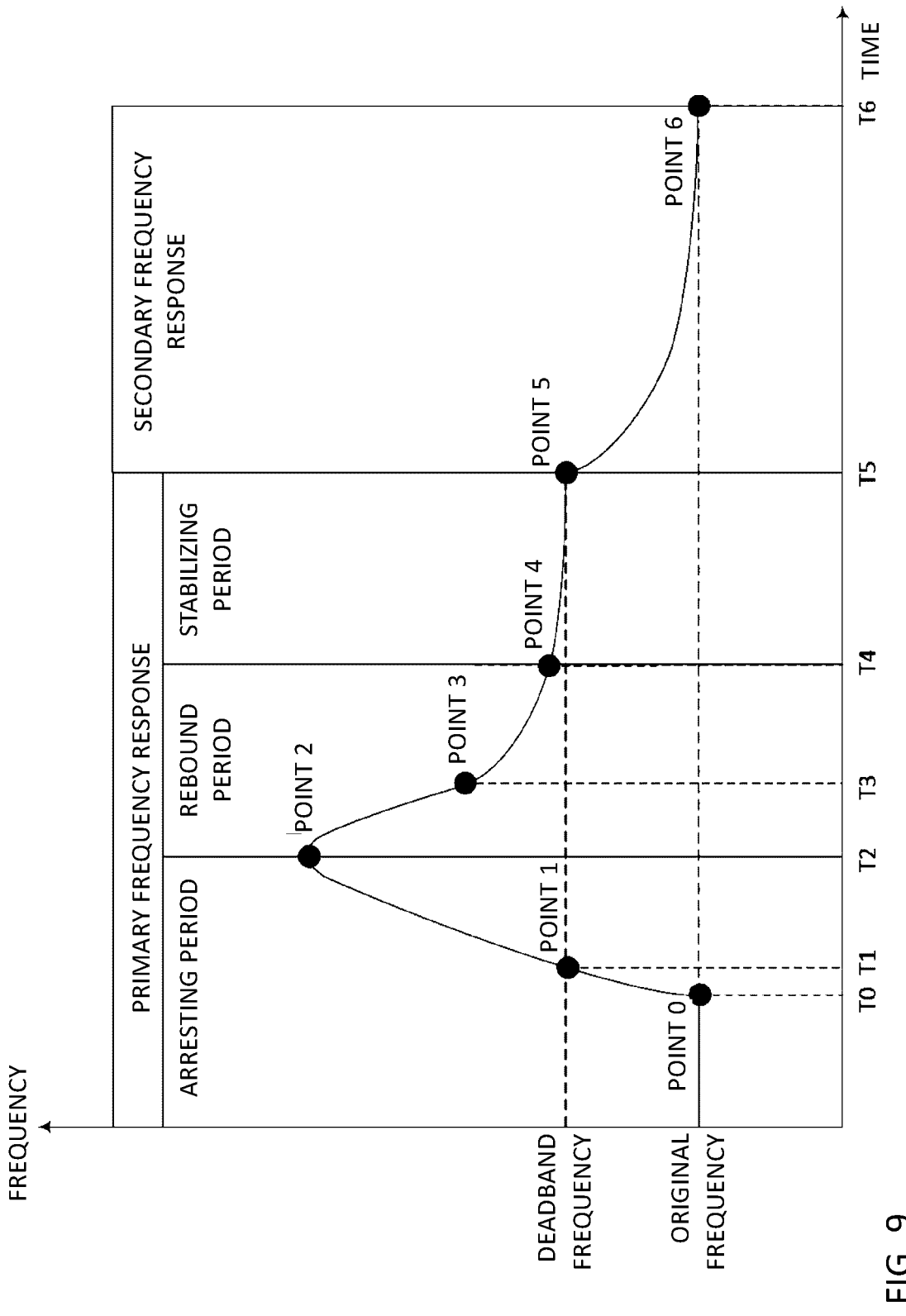
FIG. 9 is an example chart depicting a frequency control power curve for a typical over-frequency event according to an exemplary embodiment of the invention.

FIG. 9 is an example chart depicting a frequency control power curve for a typical over-frequency event according to an exemplary embodiment of the invention. In this example chart the original frequency is at Point 0. Point 1 is the point at which the frequency has left a specified acceptable range, the deadband, and begun an over-frequency event. Point 2 is defined by the frequency zenith point, the highest point in the over-frequency event. Point 2 can alternatively be named as a frequency nadir in over-frequency events. Points 0, 1, and 2 define the arresting period as the PFR begins to reduce active power and stop the increase in frequency. This arresting period is shown with time references T0, T1, and T2. The next phase is the rebound period ranging from Point 2 to Point 3, and from Point 3 to Point 4, and from time period T2 to T3 and then from T3 to T4. During this rebound period the frequency begins its decrease towards or back to the deadband. The next period is the stabilizing period ranging from Point 4 to Point 5, and from time period T4 to T5. During this stabilizing period the frequency event has been stabilized, which is generally the main responsibility of the PFR The next phase is the secondary frequency response from Point 5 to Point 6, and from time period T5 to T6. During this phase, secondary, more slowly responding technologies continue to reduce active power and ensure that the frequency remains within the deadband and returns to the original desired frequency.

Figure 10:
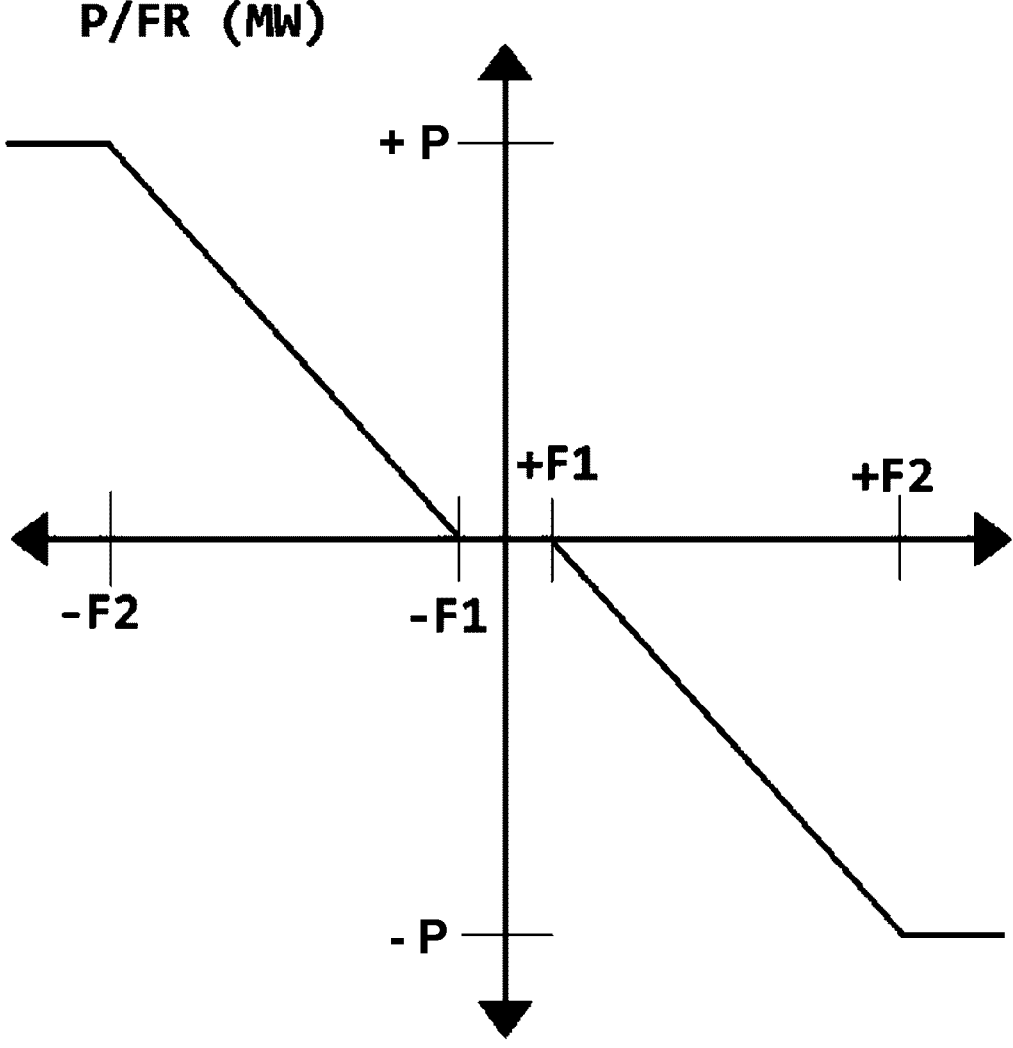
FIG. 10 is an example graphical image depicting the direct correlation between the active power increase or decrease correlated to a frequency increase or decrease referred to as the power vs cost frequency delta.

FIG. 10 is an example graphical image depicting the direct correlation between the active power increase or decrease with a frequency decrease or increase, referred to as the power vs cost frequency delta. In this image, as the frequency decreases from −F1 to −F2, the power delta increases proportionally from 0 to +P. In this image, as the frequency increases from +F1 to +F2, the power delta decreases proportionally from 0 to −P. This image graphically presents the direct correlation between the delta for a decreasing frequency and a delta for an increase in active power; this image also graphically presents the direct correlation between the delta for an increasing frequency and a delta for a decrease in active power.

C. Variations

Embodiments, depending on their configuration, may exhibit all or fewer than all of the advantages described herein. Other advantages not mentioned may be present in one or more of the embodiments.

Features from any of the embodiments may be combined with features from any of the other embodiments to form another embodiment within the scope of the invention.

In general, unless otherwise indicated, singular elements may be in the plural and vice versa with no loss of generality.

The detailed description has been presented partly in terms of methods or processes, symbolic representations of operations, functionalities and features of the invention. These method descriptions and representations are the means used by those skilled in the art to most effectively convey the substance of their work to others skilled in the art. A software implemented method or process is here, and generally, understood to be a self-consistent sequence of steps leading to a desired result. These steps require physical manipulations of physical quantities. Often, but not necessarily, these quantities take the form of electrical or magnetic signals or values capable of being stored, transferred, combined, compared, and otherwise manipulated. It will be further appreciated that the line between hardware and software is not always sharp, it being understood by those skilled in the art that the software implemented processes described herein may be embodied in hardware, firmware, software, or any combination thereof. Such processes may be controlled by coded instructions such as microcode and/or by stored programming instructions in one or more tangible or non-transient media readable by a computer or processor. The code modules may be stored in any computer storage system or device, such as hard disk drives, optical drives, solid state memories, etc. The methods may alternatively be embodied partly or wholly in specialized computer hardware, such as ASIC or FPGA circuitry.

It will be clear to one having skill in the art that further variations to the specific details disclosed herein can be made, resulting in other embodiments that are within the scope of the invention disclosed. Two or more steps in the flowcharts may be performed in a different order, other steps may be added, or one or more may be removed without altering the main outcome of the process or function of the invention. Flowcharts from different figures may be combined in different ways. Modules may be divided into constituent modules or combined into larger modules.

All parameters, quantities and configurations described herein are examples only and may be changed depending on the specific embodiment implemented.

Throughout the description, specific details have been set forth in order to provide a more thorough understanding of embodiments of the invention. However, the invention may be practised without these specific details. In other instances, well known elements have not been shown or described in detail and repetitions of steps and features have been omitted to avoid unnecessarily obscuring the invention. Accordingly, the specification and drawings are to be regarded in an illustrative, rather than a restrictive, sense. It will be clear to one having skill in the art that variations to the details disclosed herein can be made, resulting in other embodiments that are within the scope of the invention disclosed. Accordingly, the scope of the invention is to be construed in accordance with the substance defined by the claims.

All references cited herein and in said references are incorporated herein by reference in their entirety.

What is claimed is:

1. A system for providing electrical energy to an electrical grid, the system having an electrical generator connected to the electrical grid, the system comprising:
(a) an energy storage device for storing the electrical energy, the energy storage device being operable to receive the electrical energy from at least one of the electrical generator and the electrical grid, the energy storage device being operable to provide the electrical energy to the electrical grid; and (b) a controller operable to:
reduce an output level of the electrical generator in response to an over-frequency event;
cause the energy storage device to provide the electrical energy to the electrical grid in response to an under-frequency event;
adjust a state of charge (SOC) of the energy storage device in response to the output level of the electrical generator; and
adjust the SOC such that a first ratio, of the SOC to a maximum SOC of the energy storage device, matches a second ratio, of the output level of the electrical generator to a maximum output level of the electrical generator.

2. The system of claim 1, wherein the energy storage device has a storage capacity and power output rating based on a reserve capacity of the electrical generator.

3. The system of claim 1, further comprising a power adapter for producing alternating current (AC) electrical energy from the electrical energy stored in the energy storage device, the power adapter being operable to provide the AC electrical energy to the electrical grid.

4. The system of claim 3, wherein the controller is operable to control the electrical generator and the energy storage device such that a frequency of the AC electrical energy remains within a predetermined acceptable frequency range.

5. The system of claim 4, wherein the controller is operable to:
reduce the output level of the electrical generator in response to the frequency exceeding the predetermined acceptable frequency range; and
cause the energy storage device, instead of the electrical generator, to provide a controlled amount of the electrical energy to the electrical grid in response to the frequency falling below the predetermined acceptable frequency range.

6. The system of claim 1, further comprising at least one additional electrical generator, the controller being operable to reduce an output level of one or more of the at least one additional electrical generator in response to the over-frequency event.

7. The system of claim 1 further comprising at least one additional energy storage device, the controller being operable to cause one or more of the at least one additional energy storage device to provide further electrical energy to the electrical grid in response to the under-frequency event.

8. The system of claim 1 wherein the energy storage device is a supercapacitor or a battery.

9. A computer-implemented method of controlling electrical energy supplied to an electrical grid to which an electrical generator is connected, the method comprising:
(a) storing, in an energy storage device, the electrical energy, which is received from at least one of the electrical generator and the electrical grid;
(b) detecting, by a controller, an over-frequency event;
(c) in response to the over-frequency event, controlling the electrical generator by the controller to reduce an output level of the electrical generator;
(d) detecting, by the controller, an under-frequency event;
(e) in response to the under-frequency event, controlling the energy storage device by the controller to provide the electrical energy from the energy storage device to the electrical grid;
(f) adjusting, by the controller, a state of charge (SOC) of the energy storage device in response to the output level of the electrical generator, comprising adjusting the SOC such that a first ratio, of the SOC to a maximum SOC of the energy storage device, matches a second ratio, of the output level of the electrical generator to a maximum output level of the electrical generator.

10. The method of claim 9 wherein the energy storage device has a storage capacity and a power output rating based on a reserve capacity of the electrical generator.

11. The method of claim 9 wherein step (e) comprises producing AC electrical energy from the stored electrical energy by a power adapter and providing, by the power adapter, the AC electrical energy to the electrical grid.

12. The method of claim 9 wherein:

step (c) comprises controlling the electrical generator such that a frequency of the electrical energy, when provided to the grid via alternating current, remains within a predetermined acceptable frequency range; and step (e) comprises controlling the electrical storage device such that the frequency remains within the predetermined acceptable frequency range.

13. The method of claim 12 wherein:

step (c) comprises controlling the electrical generator to reduce the output level of the electrical generator in response to the frequency exceeding the predetermined acceptable frequency range; and step (e) comprises controlling the energy storage device, instead of the electrical generator, to provide a controlled amount of the electrical energy to the electrical grid in response to the frequency falling below the predetermined acceptable frequency range.

14. The method of claim 9 wherein step (c) comprises controlling at least one additional electrical generator to reduce an output level of one or more of the at least one additional electrical generator.

15. The method of claim 9 wherein step (e) comprises controlling at least one additional energy storage device to provide further electrical energy from one or more of the at least one additional energy storage device.

16. The method of claim 9 wherein the energy storage device is a supercapacitor or a battery.

17. The system of claim 1, wherein the energy storage device has a storage capacity equal to that of a response to an expected under-frequency event.

18. The system of claim 1, wherein the energy storage device has a power output rating equal to that of a prescribed response to an expected under-frequency event.

19. The system of claim 1, wherein the electrical generator runs on a renewable energy source.

* * * * *